United States Patent
Dubeyko et al.

(10) Patent No.: US 11,650,748 B1
(45) Date of Patent: May 16, 2023

(54) METHOD OF DELAYED EXECUTION OF EBPF FUNCTION IN COMPUTATIONAL STORAGE

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co Ltd., Beijing (CN)

( * ) Notice: Subject to any disclaimer, the term of this patent is extended or adjusted under 35 U.S.C. 154(b) by 0 days.

(21) Appl. No.: 17/814,140

(22) Filed: Jul. 21, 2022

(51) Int. Cl.
G06F 3/06 (2006.01)

(52) U.S. Cl.
CPC .......... *G06F 3/0644* (2013.01); *G06F 3/0679* (2013.01); *G06F 3/0604* (2013.01)

(58) Field of Classification Search
CPC ............................. G06F 3/0644; G06F 3/0604
See application file for complete search history.

(56) References Cited

U.S. PATENT DOCUMENTS

| | | | |
|---|---|---|---|
| 11,310,155 B1* | 4/2022 | Qian | H04L 45/123 |
| 2022/0174005 A1* | 6/2022 | Li | H04L 45/60 |
| 2022/0197704 A1* | 6/2022 | Gibb | G06F 9/5088 |
| 2022/0236911 A1* | 7/2022 | Jones | G06F 3/0617 |

\* cited by examiner

*Primary Examiner* — David Yi
*Assistant Examiner* — Nicholas A. Paperno
(74) *Attorney, Agent, or Firm* — Faegre Drinker Biddle & Reath LLP

(57) ABSTRACT

In a method for offloading data processing into computational storage, a request to offload data computation into computational storage is received. One or more transactions to encapsulate the request are prepared. One or more write requests are generated based on the one or more transactions, and the one or more transactions are stored into one or more journals. A set of transactions is extracted from the one or more journals. A subset of the set of transactions is received at an eBPF subsystem, where the subset corresponds to one or more computation requests. Information from a file is extracted, where the information corresponds to one or more logical block addresses (LBAs). The one or more computation requests are performed on the one or more LBAs using the subset of the set of transactions, and an indication corresponding to the performed computation requests is generated.

20 Claims, 17 Drawing Sheets

US 11,650,748 B1

METHOD OF DELAYED EXECUTION OF EBPF FUNCTION IN COMPUTATIONAL STORAGE

BACKGROUND

A majority of computer readable instructions that are executed by a computing device are operations that move data. Therefore, a majority of power consumption is spent not on performing relevant computations, but rather, on moving data between a processing core and memory of the computing device. Such inefficiencies reduce performance of metadata and user data operations and can shorten the lifetime of computing device memory on which a relatively high amount of read and write instructions are being performed.

It is with respect to these and other general considerations that aspects of the present disclosure have been described. Also, although relatively specific problems have been discussed, it should be understood that the embodiments disclosed herein should not be limited to solving the specific problems identified in the background.

SUMMARY

Aspects of the present disclosure relate to methods, system, and media for offloading data processing into computational storage.

In one aspect of the present disclosure, a method for offloading data processing into computational storage is provided. A request to offload data computation into computational storage is received. One or more transactions to encapsulate the request are prepared. One or more write requests are generated based on the one or more transactions, and the one or more transactions are stored into one or more journals. A set of transactions is extracted from the one or more journals. A subset of the set of transactions is received at an eBPF subsystem, where the subset corresponds to one or more computation requests. Information from a file is extracted, where the information corresponds to one or more logical block addresses (LBAs). The one or more computation requests are performed on the one or more LBAs using the subset of the set of transactions, and an indication corresponding to the performed computation requests is generated.

In another aspect, a system for offloading data processing into computational storage is provided. The system comprises a first device comprising a computational component; a second device comprising a computational component; and memory storing instructions. When the instructions are executed by the computational component of at least one of the first device and the second device, the instructions cause the system to perform a set of operations comprising: receiving, via the computational component of the first device, a request to offload data computation into the second device; preparing, via the computational component of the first device, one or more transactions to encapsulate the request; generating, via the computational component of the first device, one or more write requests based on the one or more transactions; storing, via the computational component of the first device, the one or more transactions into one or more journals of the first device; extracting, via the computational component of the second device, a set of transactions from the one or more journals; receiving, via an eBPF subsystem of the second device, a subset of the set of transactions, the subset corresponding to one or more computation requests; extracting, via the computational component of the second device, information from a file, the information corresponding to one or more logical block addresses (LBAs); performing, via the computational component of the second device, the one or more computation requests on the one or more LBAs using the subset of the set of transactions; and generating, via the computational component of the second device, an indication corresponding to the performed computation requests.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
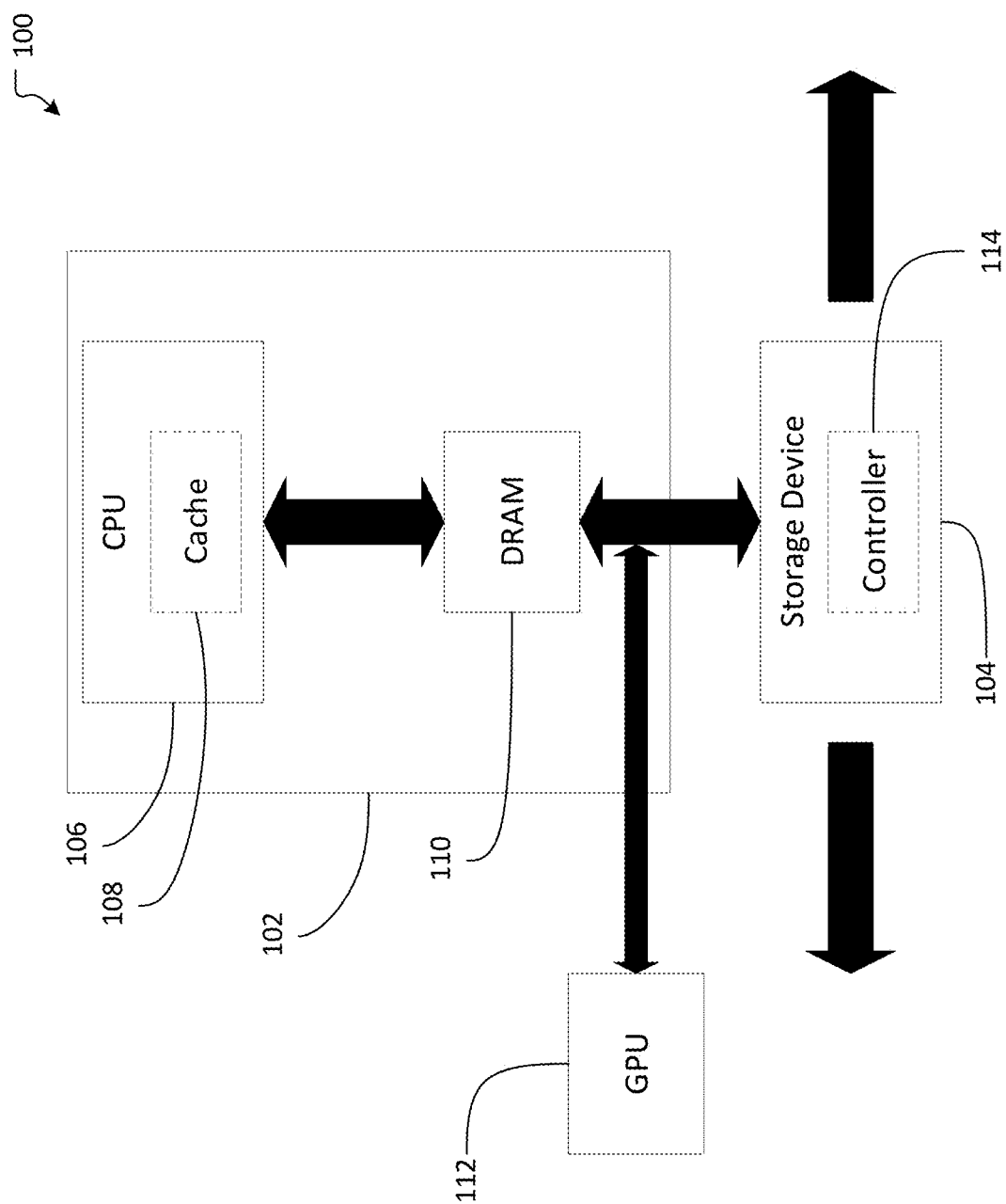
FIG. 1 illustrates an overview of a conventional system without computational storage.

In the following Detailed Description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Various examples illustrating aspects of the present disclosure are described herein. Across examples, components may be described with similar names (e.g., journal, core, zone, NAND die or die, volume, file system, etc.). It should be recognized that components with similar names, and described in different examples, may be capable of performing similar functions or interacting with other components in similar manners. Alternatively, in some examples, components with similar names, and described in different examples, may be capable of performing different functions or interacting with different components than the earlier/later described components with the similar names.

As mentioned above, a majority of computer readable instructions that are executed by a computing device are operations that move data. Therefore, a majority of power consumption of a computing device is spent not on performing relevant computations, but rather on moving data between a processing core and memory of the computing device. Such inefficiencies reduce performance of metadata and user data operations and can shorten the lifetime of computing device memory on which a relatively high amount of read and write instructions are being performed.

The rise of big data sets in industry and the need for larger memory volumes in computing technology applications have created inefficiencies in data processing that are time-consuming and power consuming. Generally speaking, 80% of machine instructions are operations that move data from one location to another location. Therefore, the majority of power consumption in a data processing system is spent not on relevant computations, but rather on moving data and/or instructions between a processing core and memory.

Central processing unit (CPU) caches may improve data processing performance, but as a side effect, the caches need to employ complicated cache coherence protocols to achieve a consistent view of data in memory, using cores of the central processing unit. Further, CPU caches may be built on static random-access memory (SRAM) that is relatively fast, but also consumes a relatively large quantity of power. Dynamic random-access memory (DRAM) can also consume a relatively large quantity of power (e.g., since cells of DRAM are refreshed every 64 to 32 milliseconds to keep data). So, increasing a capacity of DRAM or CPU cache size can result in an increase in power consumption. On the other hand, persistent memory does not need to refresh memory cells and is therefore much more power-efficient. Some computing systems require moving data from persistent storage into DRAM with the goal to access and process data by CPU cores. Persistent memory technologies continue to become faster for computations; however, modern computing systems negate the advantages being made in persistent memory technologies because of known drawbacks.

File storage systems may contain information that is stored in persistent memory of the associated storage devices. For a host device to perform actions that are based on the information stored in the persistent memory of the associated storage device, the information has to first be retrieved from the persistent memory (e.g., a read operation needs to be performed) of the storage device into DRAM on the host side, then the CPU core on the host side can execute some function (execute some computation) based on the retrieved information. The result of the computation executed by the CPU core on the host side then must be stored from the DRAM on the host side into the persistent memory of the storage device. Using such conventional implementations not only requires extensive data moving and/or data exchange operations between the host device and the storage device, but also requires extensive moving operations between the DRAM and L caches of the CPU cores on the host side.

Aspects of the present disclosure address the above-mentioned deficiencies, in addition to further benefits which may be recognized by those of ordinary skill in the art. For example, using systems and mechanisms described herein, data processing can be offloaded from a host device to a storage device (e.g., a computational storage device). Accordingly, data and metadata can be processed in persistent memory space, without depleting computational resources of the host device. Generally, methods and systems disclosed herein provide powerful techniques to offload data processing onto a computational storage device that interacts with a host device.

More specifically, field-programmable gate array (FPGA), application-specific integrated circuit (ASIC), or RISC-V core(s) may retrieve data, execute a computation or function, and return results of the computation or function, all inside of the same device (e.g., a computational storage device). Some advantages may be that: (1) data moving operation on a host side are excluded, (2) data processing inside of computational storage can be executed by multiple FPGA cores in parallel, and (3) results of operation, such as computational operations, can be stored into persistent memory by a computational storage device itself. All of these points improve performance because a host device does not spend resources on data moving operations.

FIG. 1 illustrates an overview of a conventional system 100 without computational storage. The system 100 include a host device 102 and a storage device 104 (e.g., a solid-state drive (SSD) or a hard disk drive (HDD)). The host device 102 may be coupled to, or otherwise in communication with, the storage device 104. The host device 102 includes a processor 106 (e.g., a central processing unit (CPU)). The processor 106 may include a cache 108. The cache 108 may store a local copy of data that is used by the processor 106 for executing functions for host device 102. The host device 102 further includes memory 110 (e.g., dynamic random-access memory (DRAM)). The processor 106 may be coupled to and/or in communication with the memory 110 to execute read and/or write instructions for data operations. The host device 102 may further be in communication with and/or include a graphical processing unit (GPU) 112. The graphical processing unit 112 may also be coupled to and/or in communication with the memory 110 to execute read and/or write instructions for data operations. The storage device 104 further includes a controller 114.

A controller, as described with respect to conventional systems discussed herein, refers to a system that may include a component, such as an application-specific integrated circuit (ASIC), that manages read and/or write operations using input-output (I/O) systems. The combination of a controller and persistent memory, as discussed with respect to FIG. 1, differs from computational storage devices discussed below, at least because a computational storage device utilizes a computational component to perform computations, or other processing, on data that is already stored in the computational storage device. That is, the computational storage device can receive instructions to process, or perform computations, on the data in the computational storage device that is already stored at the computational storage device. As an example, one or more instructions may be sent to the computational storage device to execute some computation inside of computational storage device on data that is already stored at the computational storage device. Such data may be stored or provided to the computational storage device by means of standard I/O operations from a host or controller; however, the computational storage device is configured to receive one or more instructions, from the host for example, and perform a computation on the data, where the computation goes beyond accessing, moving, or storing the data. For example, the computational storage device may perform computations, including but not limited to Boolean computations, arithmetic computations, logical computations, interference computations, etc. Alternatively, or in addition, if data is stored at the host side then, such computations may be performed at the host side. However, if the data is already stored in the computational storage device, then from a computation and efficiency perspective, it makes sense to offload the computation by performing the computations via the computational storage device. In examples, a computational storage device may include a field-programmable gate array (FPGA), ASIC, or RISC-V to perform such computations.

Aspects of the system 100 may exemplify common issues that are faced using conventional data storage methods. For example, caches (e.g., cache 108) may experience cache coherence problems where data that is stored across multiple local caches are not properly synchronized as the processor 106 updates local copies of data (e.g., after performing write and/or update operations). Further, memory (e.g., memory 110) may face a memory wall problem, such as occurs when the rate of improvement of processor performance far exceeds the rate of improvement in DRAM memory speed. Memory wall problems can be a performance bottleneck in systems operations. The system 100 may experience a throughput bottleneck as data is transferred between the host device 102 to the storage device 104. A throughput bottleneck can limit productivity and efficiency of the system 100.

System 100 may further experience data moving problems when transmitting data between the host device 102 (e.g., from memory 110) and the GPU 112. For example, transmitting data between the host device and GPU 112 may create a power consumption problem where the GPU demands a relatively large or undesirable amount of power from system 100 to receive, and/or perform operations using, data from the host device 102. Excessive data movement can reduce the lifetime of hardware components that store data (e.g., an SSD or HDD), in addition to reducing the efficiency of a system in which the data movement is occurring (e.g., system 100). Therefore, it may be beneficial to implement systems and methods in which data movement is reduced to perform desired actions or computations.

System 100 may further experience excess controller overhead at controller 114 when the controller 114 is used to manage a relatively large amount of data operations. Generally, the storage device 104 may experience big data problems, in which relatively large amounts of data and/or metadata are stored on the storage device 104. Conventional storage devices lack computational capabilities. Therefore, computations cannot be offloaded to such conventional storage devices. Accordingly, mechanisms disclosed herein that allow computations to be offloaded into a storage device are beneficial.

Figure 2:
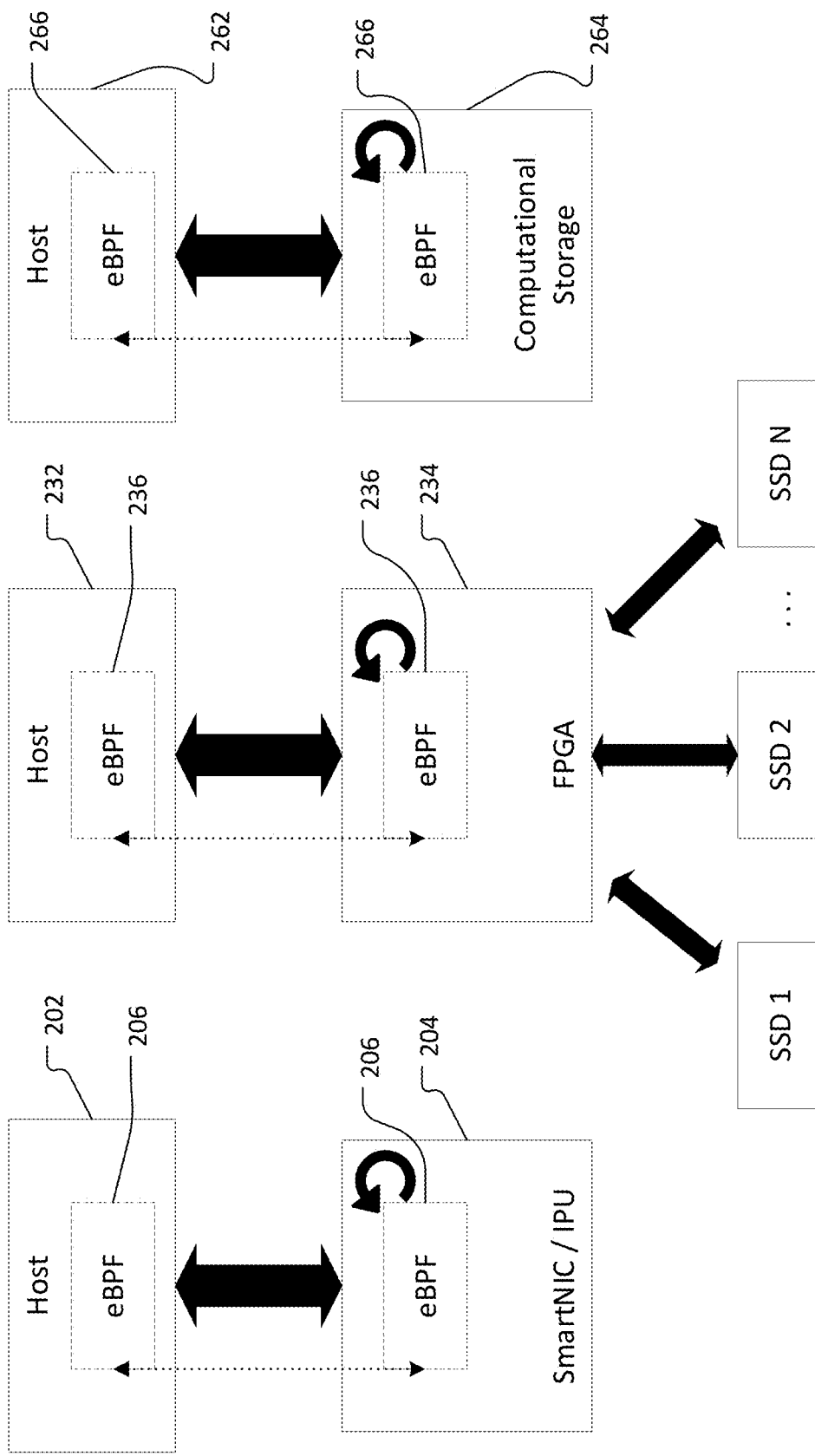
FIG. 2A illustrates an example system for offloading data processing into computational storage according to some aspects described herein.
FIG. 2B illustrates an example system for offloading data processing into computational storage according to some aspects described herein.
FIG. 2C illustrates an example system for offloading data processing into computational storage according to some aspects described herein.

FIGS. 2A-2C illustrate example systems for offloading data processing into computational storage according to some aspects described herein. In some examples, the storage device can be implemented as a storage device with embedded computation (e.g., a smart solid-state drive (SmartSSD), a smart network interface card (smartNIC), an intelligence processing unit (IPU), a specialized hardware accelerator, etc.). The responsibility of the host device may be to deliver an executable function to the storage side device (e.g., via an extended Berkeley packet filter (eBPF)) and initiate data processing to occur within the storage device (e.g., computational storage).

FIG. 2A illustrates an example system 200 for offloading data processing into computational storage. The system 200 includes a host device 202 and a hardware architecture or hardware accelerator 204. In the example system 200, the hardware accelerator 204 is a programmable accelerator, such as a smartNIC, or an IPU. The hardware architecture 204 can include a computational storage device, such as computational storage device 234, and/or 264 discussed further below. For example, the hardware architecture 204 can include a storage component, such as one or more solid-state drives (SSDs). Further, the hardware architecture 204 can include a computational component, such as an FPGA. The storage component and computational component may form the computational storage device on the hardware architecture 204.

The hardware architecture 204 may be configured to receive network packets. The hardware architecture 204 can include an operating system (OS) kernel or kernel-space (e.g., Linux kernel), and one or more eBPF subsystem(s) 206 that are configured to execute instructions within the kernel. Alternatively, the one or more eBPF subsystem(s) 206 can be implemented on hardware only (e.g., hardware of the smartNIC or IPU). Further, the host device 202 can include a kernel or kernel-space, and one or more eBPF subsystem(s) 206 that are configured to execute instructions within the kernel. Additionally, or alternatively, the host device 202 can include a user-space, and the one or more eBPF subsystem(s) 206 can be configured to execute instructions within the user-space. One of ordinary skill in the art will recognize types of eBPF subsystem(s) 206 that can be configured to be executed by the host device 202 and/or the hardware architecture 204.

The hardware architecture 204 may be configured to analyze and/or parse contents of network packets to determine results corresponding to the received network packets. For example, the host 202 may send network packets to the hardware architecture 204, and the hardware architecture 204 (e.g., a SmartNIC) may send the network packets to another host. Alternatively, the hardware architecture 204 (e.g., a SmartNIC) may receive the network packets from another host, analyze the networks packets, and deliver a result of the analysis to the host 202. The hardware architecture 204 may further be configured to process data corresponding to the determined results, and store results into non-volatile memory or persistent memory (e.g., flash memory). In this regard, data processing may be offloaded from the host device 202 to the hardware architecture 204.

FIG. 2B illustrates an example system 230 for offloading data processing into computational storage. The system 230 includes a host device 232 and a computational storage device 234 (e.g., a combination of a hardware accelerator and one or more storage devices). In the example system 230, the computational storage device 234 is an integrated circuit, such as an FPGA, ASIC, or RISC-V that includes one or more solid state drives (SSD). For example, the FPGA may be coupled to the one or more solid state drives (SSD). The computational storage device 234 may be configured to receive network packets. The computational storage device 234 can include a kernel or kernel-space (e.g., a Linux OS kernel-space), and one or more eBPF subsystem(s) 236 that are configured to execute instructions within the kernel. Alternatively, the one or more eBPF subsystem(s) 236 can be implemented on hardware only (e.g., hardware of the FPGA). Further, the host device 232 can include a kernel or kernel-space, and one or more eBPF subsystem(s) 236 that are configured to execute instructions within the kernel. Additionally, or alternatively, the host device 232 can include a user-space, and the one or more eBPF subsystem(s) 236 can be configured to execute instructions within the user-space. One of ordinary skill in the art will recognize types of eBPF subsystem(s) 236 that can be configured to be executed by the host device 232 or the computational storage device 234.

The computational storage device 234 may be configured to analyze instructions (e.g., received from the host device 232) to determine functions or computations corresponding to the received instructions. The computational storage device 234 may further be configured to process data corresponding to the determined results, and store results into non-volatile memory or persistent memory (e.g., flash memory). In this regard, data processing may be offset from the host device 232 to the computational storage device 234.

FIG. 2C illustrates an example system 260 for offloading data processing into computational storage. The system 260 includes a host device 262 and a storage device 264. In the example system 260, the storage device 264 is a computational storage device. The storage device 264 may be configured to receive instructions. The storage device 264 can include an operating system kernel or kernel-space, and one or more eBPF subsystem(s) 266 that are configured to run within the kernel. Alternatively, the one or more eBPF subsystem(s) 266 can be implemented on hardware only (e.g., hardware of the computational storage device 264). Further, the host device 262 can include a kernel or kernel-space, and one or more eBPF subsystem(s) 266 that are configured to execute instructions within the kernel. Additionally, or alternatively, the host device 262 can include a user-space, and the one or more eBPF subsystem(s) 266 can be configured to execute instructions within the user-space. One of ordinary skill in the art will recognize types of eBPF subsystem(s) 266 that can be configured to be executed by the host device 262 or the storage device 264.

The storage device 264 may be configured to analyze instructions (e.g., received from the host device 262) to determine functions or computations corresponding to the received instructions. The storage device 264 may further be configured to process data corresponding to the determined results, and store results into non-volatile memory or persistent memory (e.g., flash memory). In this regard, data processing may be offloaded from the host device 262 to the storage device 264.

Figure 3:
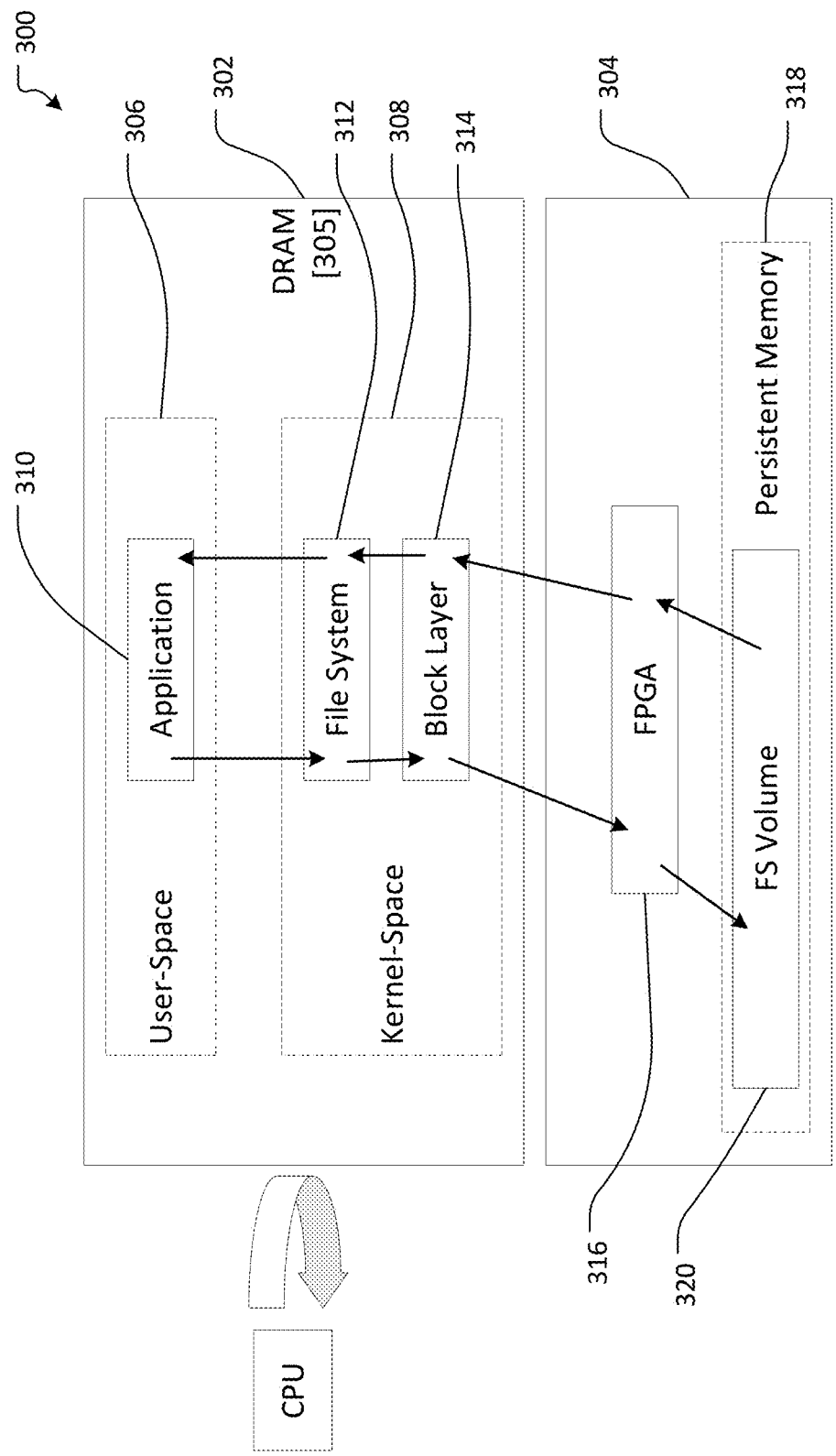
FIG. 3 illustrates an example system for offloading data processing into computational storage according to some aspects described herein.

FIG. 3 illustrates an example system 300 for offloading data processing into computational storage according to some aspects described herein. The system 300 includes a host device 302 and a computational storage device 304 (sometimes referred to herein simply as storage device for brevity). The host device 302 may include dynamic random-access memory (DRAM) 305. The host device 302 may further include an operating system user-space 306 and an operating system kernel-space 308. The user-space 306 correspond to segments of memory that are designated to store computer-readable instructions corresponding to user-space related functions. For example, the user-space 306 may include an application 310. The application 310 may be a word processing application, a graphics application, a computational application, a modelling application, or any other type of application recognized by those of ordinary skill in the art.

Similar to the OS user-space 306, the OS kernel-space 308 corresponds to segments of memory that are designated to store computer-readable instructions corresponding to kernel-space related functions that may be recognized by those of ordinary skill in the art. The kernel-space 308 may include a file system driver 312 and a block layer 314. The file system driver 312 may receive data from the application 310, and the application 310 may transmit data to the file system driver 312 (e.g., via a processor), or vice-versa. The block layer 314 may receive data from file system driver 312 (e.g., via a processor), or vice-versa. The block layer 314 may then transfer or transmit data to the storage device 304, or vice-versa.

The storage device 304 includes a computational component, such as but not limited to an FPGA 316, and persistent memory 318. The host device 302 may store data (e.g., user data and/or metadata) in the storage device 304 (e.g., in the persistent memory 318), for example, via an ASIC controller. The FPGA 316 may interact with the persistent memory 318 (e.g., via read and/or write instructions) to perform functions or computations (e.g., Boolean computations, arithmetic computations, logical computations, interference computations, etc.), such as functions or computations designated by the kernel-space 308. The persistent memory 318 may include a file system (FS) volume or volume 320. The file system volume 320 may store user data and/or metadata related to the file system 312 and/or the application 310.

Generally, file systems provide a way to manage and access data for applications. A file system is a mediator between applications and storage devices. File systems may contain metadata, that is usually unseen by an application, on a file system volume. Information that an application is trying to read or write can be user data. In some instances, user data can contain metadata from an application, that a user can see and modify.

The file system driver 312 may contain knowledge about metadata and user data that are stored in the storage device 304 (e.g., in the persistent memory 318 of the storage device 304). In this respect, the file system driver 312 can transfer a series of functions to be executed (e.g., compiled in a journal or other data structure) to the storage device 304 on which the functions are executed. Accordingly, the file system driver 312 can offload processing of metadata and user data onto the storage device 304 because the storage device 304 is a computational storage device (e.g., a storage device with hardware-assisted processing capabilities).

The file system driver 312 can perform a number of functions. The file system driver 312 can identify addresses in persistent memory 318 (e.g., logical block addresses or LBAs) that need to be processed, for example that need to be processed for the application 310. The file system driver 312 can identify the type of data that is stored in the addresses in persistent memory 318 (e.g., metadata, user data, etc.). Having knowledge regarding the type of data that is stored in persistent memory 318 that is desired to be accessed can be useful in increasing performance of computational functions performed by a system, such as system 300. The application 310 can define what functions or algorithms need to be applied on a file. For example, the application 310 can define the function or algorithm on the basis of the particular data type in a file. The file system driver 312 can identify LBAs that contain data corresponding to the file on which the functions or algorithms (as defined by the application 310) need to be applied. The application 310 can request an execution of the functions or algorithms for the file, and the file system driver 312 can transmit the functions, with a definition of relevant LBA ranges or sets of LBAs on the computational storage device 304. The host device 302 can retrieve the result of data processing from the storage device 304, based on the identifications made, or knowledge stored, by the file system driver 312.

Figure 4:
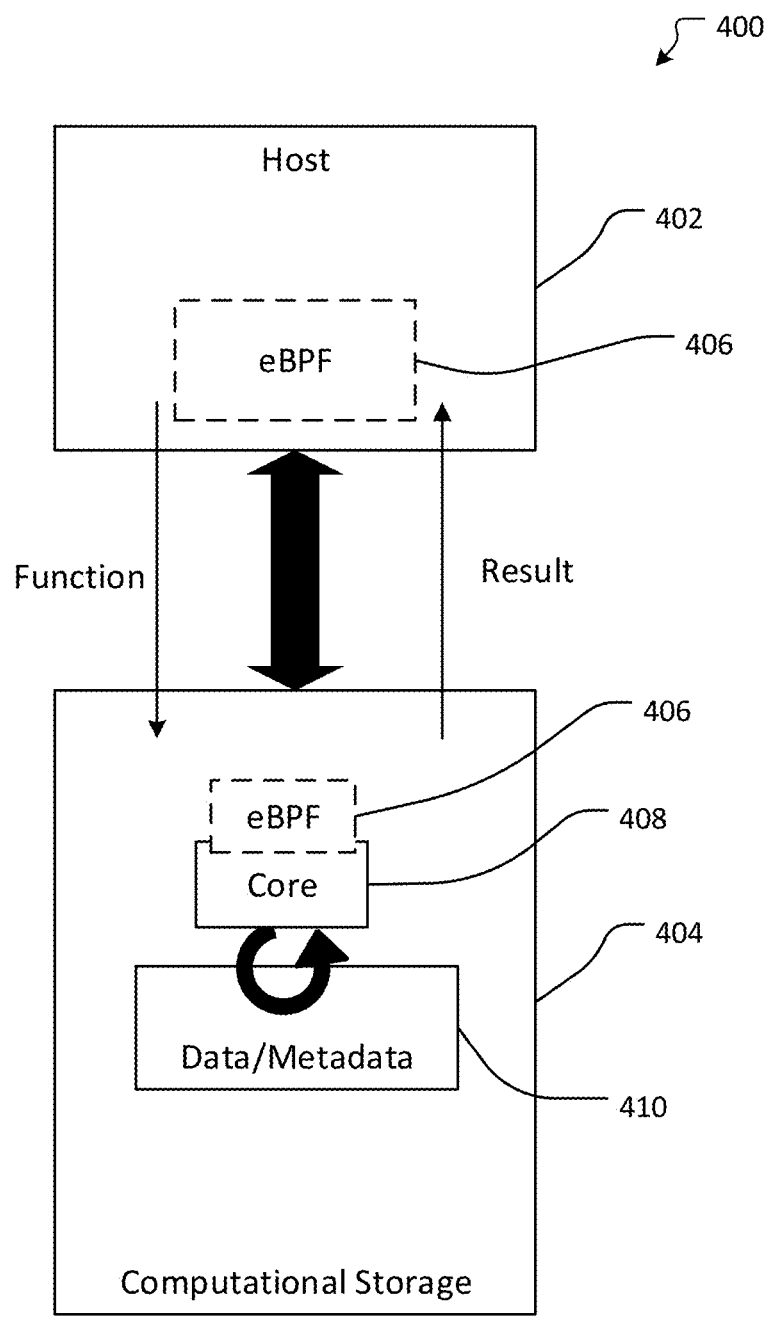
FIG. 4 illustrates an example system for offloading data processing into computational storage according to some aspects described herein.

FIG. 4 illustrates an example system 400 for offloading data processing into computational storage according to some aspects described herein. The system 400 may be similar to the system 300. For example, the system 400 includes a host device 402 and a computational storage device 404. The host device 402 includes an operating system kernel-space or operating system user-space with one or more eBPF subsystem(s) 406 that are configured to run therein. The host device 402 is coupled to, or otherwise in communication with the storage device 404.

The storage device 404 is a computational storage device. The computational storage device 404 can be the combination of various types of memory. For example, the computational storage device 404 can include one or more from the group of NAND flash, non-volatile memory (NVM), storage class memory (SCM), and dynamic random-access memory (DRAM). The computational storage device 404 can include an operating system kernel with one or more eBPF subsystem(s) 406 that are configured to run therein. Alternatively, the computational storage device 404 can implement the eBPF subsystem(s) 406 on a hardware level. The computational storage device 404 can include one or more FPGA cores 408 (sometimes referred to herein simply as cores, for brevity) that are configured to execute instructions stored in memory. The computational storage device 404 can further include persistent memory (e.g., persistent memory 318 as shown in the example system 3 of FIG. 3) that stores data and/or metadata 410 therein.

Generally, persistent memory is the main memory space in which a file system's metadata and user data is stored persistently. The computational storage device 404 can include dynamic random-access memory (DRAM) as temporary memory or non-volatile memory (NVM) to process I/O requests from the host device 402. In this respect, the computational storage device 404 can process metadata and user data to offload computational demands from the host device 402. The one or more cores 408 may be one or more cores of an FPGA, ASIC, or RISC-V, for example.

The one or more cores 408 can be configured or otherwise programmed to execute data processing within the computational storage device 404. For example, the one or more cores 408 may perform computations (e.g., Boolean functions, arithmetic computations, logical computations, interference computations, etc.), in addition or alternatively to read and/or write requests, on data/metadata 410. The one or more cores 408 can be programmed before data processing requests are received from the host device 402 (e.g., by way of the one or more sequences of instructions, such as eBPF functions). Alternatively, the one or more cores 408 can execute logic instructions (e.g., the eBPF functions) as part of the data processing requests transmitted from the host device 402. Generally, the host device 402 sends a data processing request to the storage device 404 that can include one or more functions to be performed. The storage device 404 performs the functions, such as by executing instructions, via the one or more cores 408, that interact with the data/metadata 410 (e.g., by performing computations, such as Boolean functions, arithmetic functions, logic functions, interference functions, etc.). Subsequently, a result of the performed functions is received by the host device 402, such as after being transmitted from the storage device 404 to the host device 402.

Figure 5:
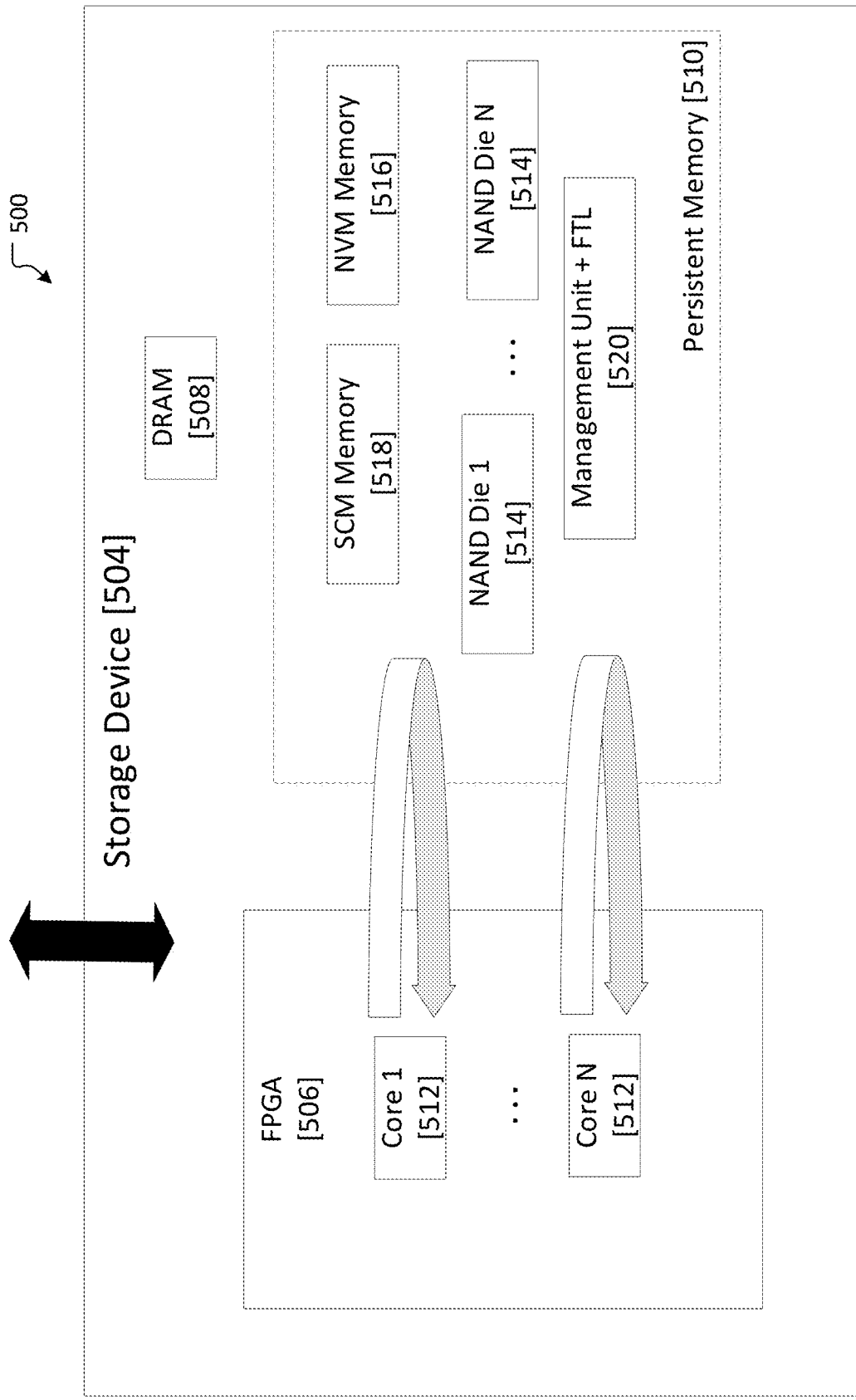
FIG. 5 illustrates an example system for offloading data processing into computational storage according to some aspects described herein.

FIG. 5 illustrates an example system 500 for offloading data processing into computational storage according to some aspects described herein. Specifically, FIG. 5 illustrates a computational storage device 504 that may be similar to the computational storage devices 304 and 404 discussed above and illustrated in FIGS. 3 and 4. The computational storage device 504 includes a field programmable gate array (FPGA) 506, dynamic random-access memory (DRAM) 508, and persistent memory 510. Collectively, the FPGA 506, DRAM 508, and persistent memory 510 may form a hardware architecture. The FPGA 506 may include one or more cores 512. The one or more cores 512 may be similar to the core 408 discussed above and illustrated in FIG. 4.

The persistent memory 510 may include one or more NAND die 514. Additionally, or alternatively, the persistent memory 510 may include non-volatile memory (NVM) 516. Additionally, or alternatively, the persistent memory 510 may include storage class memory (SCM) 518. Additionally, or alternatively, the persistent memory 510 may include a management unit with a flash translation layer (FTL) 520. One of ordinary skill in the art will recognize that the storage device 504 may include other memory architectures that perform a similar function to the example persistent memory architectures disclosed herein.

Data and metadata similar to data and metadata 410 discussed above with respect to FIG. 4 may be stored within the persistent memory 510. In this regard, the one or more cores 512 may receive data or metadata from the persistent memory 510 to perform computations or functions (e.g., Boolean computations, arithmetic computations, logical computations, interference computations, etc.). Additionally, or alternatively, the one or more cores 512 may input data or metadata into the persistent memory 510, either as the result of a computational process, or as an intermediary value in a computational process.

Figure 6:
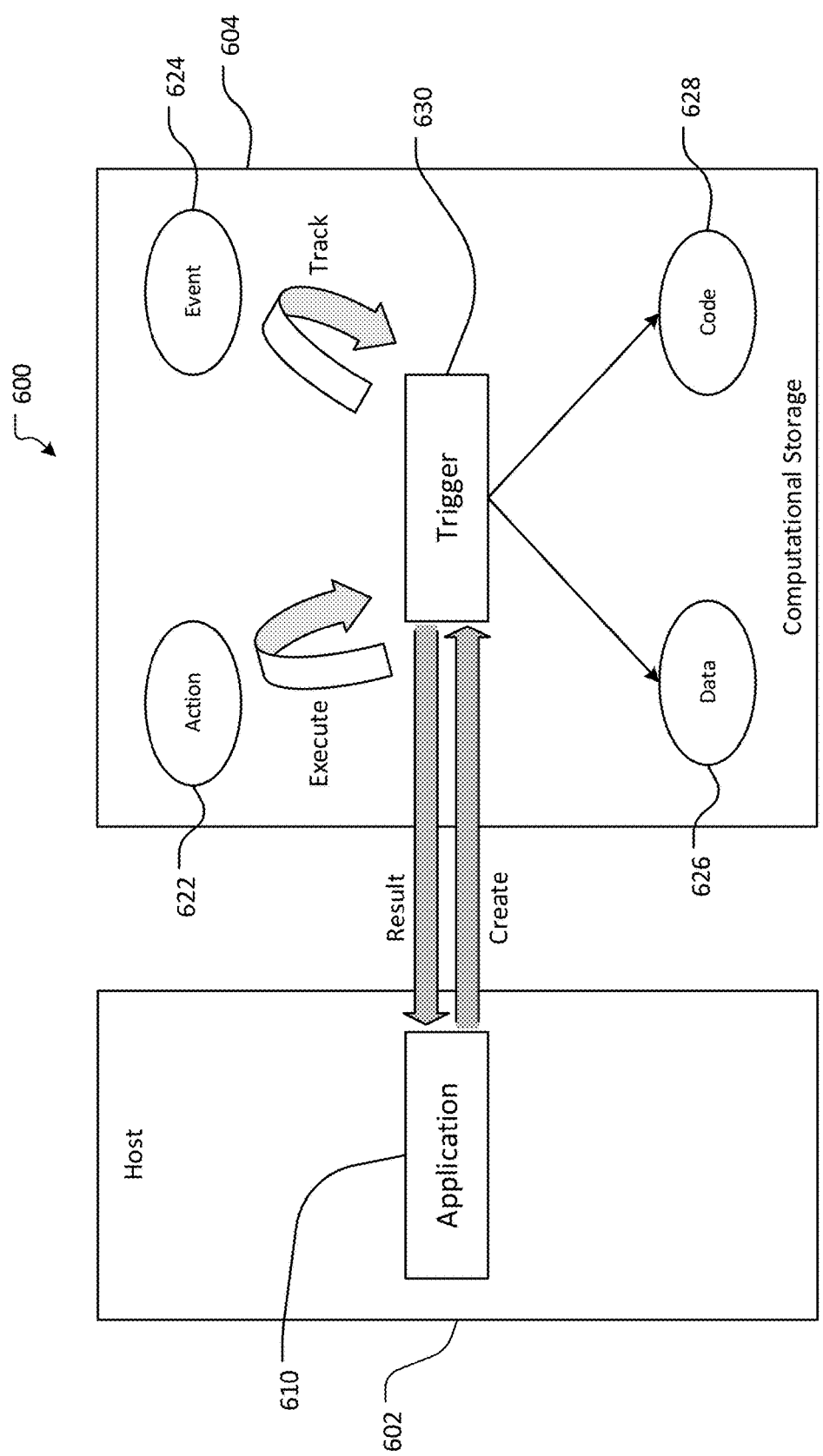
FIG. 6 illustrates a schematic diagram of a trigger execution approach in a system for offloading data processing into computational storage, according to some aspects described herein.

FIG. 6 illustrates a schematic diagram of a trigger execution approach in a system for offloading data processing into computational storage, according to some aspects described herein. The example system 600 may be similar to the example system 300 shown in FIG. 3 and discussed in detail above, and may include, for example, a host device 602 and a computational storage device 604. In an embodiment, offloading data processing from the host device 602 to the computational storage device 604 can be implemented via a trigger approach. For example, a trigger 630 may be thought of as a descriptor that defines the activity for a particular event 624. If that event 624 has occurred, then an action 622 will execute under a related piece of data 626 or code 628. In an embodiment, an application 610 on the host device 602 may request the creation of a trigger in the storage device 604, and receive as a result of the request a success or failure of trigger creation. The trigger 630 created in the storage device 604 may be executed as a reaction or response to some event (e.g., event 624). As an example, the application 610 may request the creation of a trigger (e.g., trigger 630) for a read operation in the storage device 604. Such a trigger will be executed for every (or some portion of) read I/O request received at the storage device 604. The application 610 would receive the result of the trigger execution as a result of the read I/O request.

Figure 7:
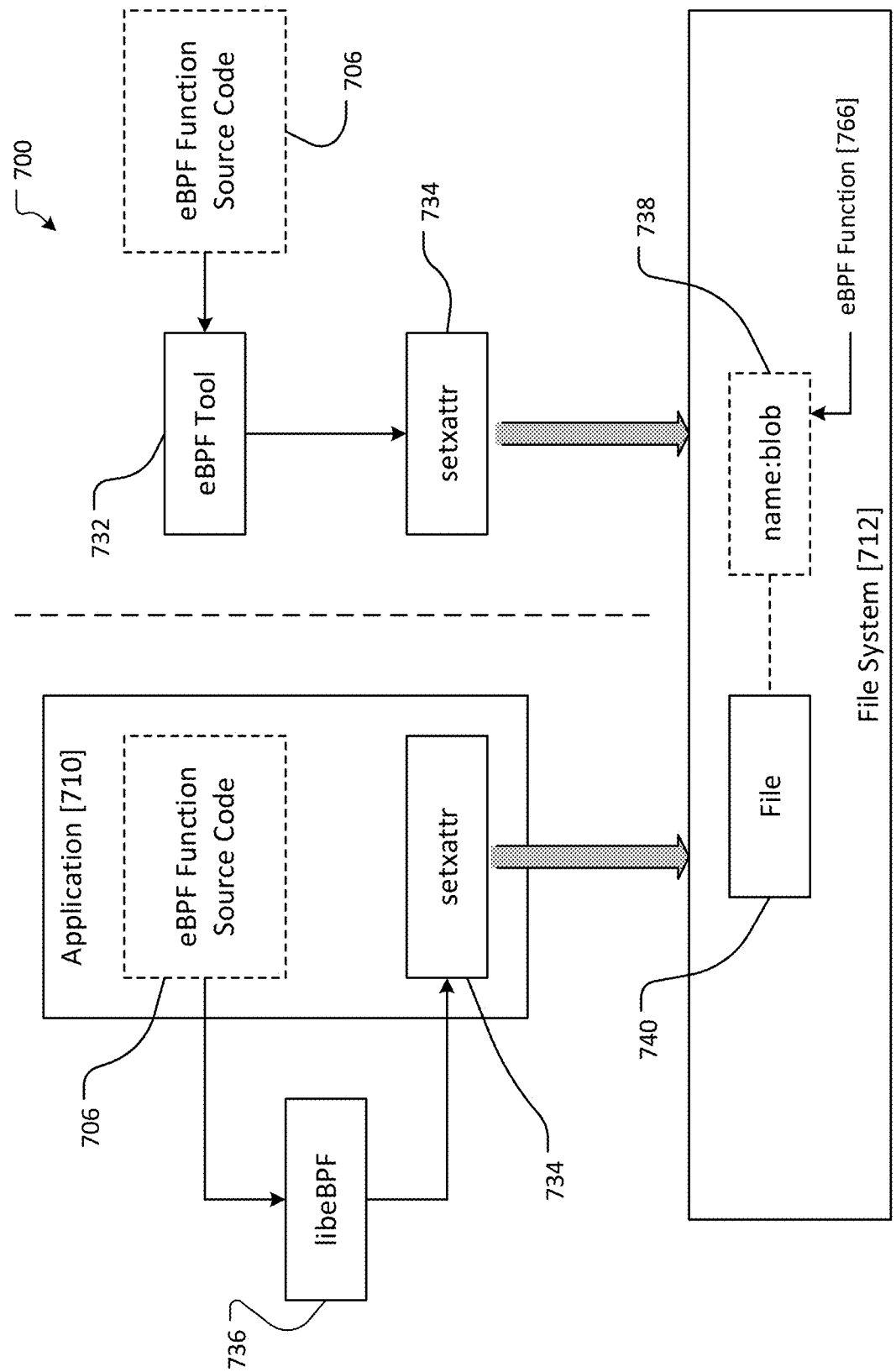
FIG. 7 illustrates a schematic diagram of registering an eBPF function according to some aspects described herein.

FIG. 7 illustrates a schematic diagram of registering an eBPF function according to some aspects described herein. The example system 700 may be similar to the example system 300 shown in FIG. 3 and discussed in detail above, and may include, for example, an application 710 (e.g., on a host device, such as host device 302) and a file system 712. In an embodiment, offloading data processing execution into computational storage may be implemented by registering an eBPF function 766 before execution. Alternatively, in an embodiment, offloading data processing execution into computational storage may be implemented by sending an eBPF function 766 to the computational storage at the timepoint of execution. For example, one way to deliver a function or executable code into computational storage is through the use of an extended attribute of a file 740 and/or folder in the file system 712. An extended attribute is a binary blob 738 that is associated with a file and/or folder and can be accessed by name.

In an embodiment, eBPF function source code 706 may be compiled by means of a special eBPF tool 732. Alternatively, or additionally, eBPF function source code 706 may be compiled via an application 710 by means of a libeBPF library 736. It should be noted that compiling eBPF function source code 706 may include converting the initial source code into bytecode that can be executed by the target platform. In an example, the extended attribute of a file 740 and/or folder in the file system 712 may be created by means of setxattr tool 734 or setxattr system call. In an embodiment, the eBPF function 766 may be stored in a dedicated xattr namespace in the file system 712.

Figure 8:
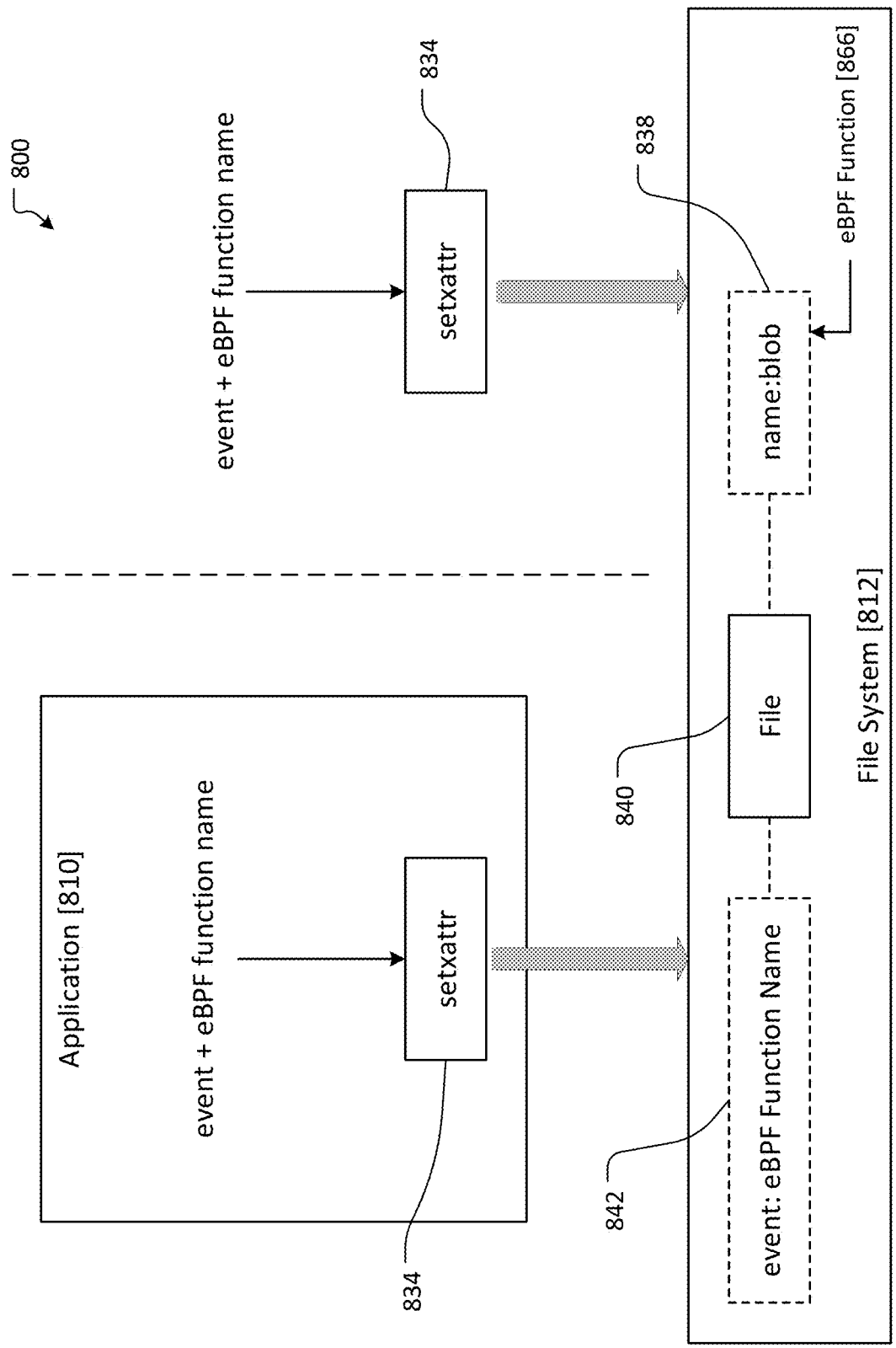
FIG. 8 illustrates a schematic diagram of registering an event of eBPF function execution according to some aspects described herein.

FIG. 8 illustrates a schematic diagram of registering an event of eBPF function execution according to some aspects described herein. The example system 800 may be similar to the example system 300 shown in FIG. 3 and discussed in detail above, and may include, for example, an application 810 (e.g., on a host device, such as host device 302) and a file system 812. In an embodiment, the execution of a registered eBPF function 866 may be immediate (e.g., by request). In another embodiment, the execution of a registered eBPF function 866 may be delayed (e.g., by event, such as event 624 shown in the system 600 of FIG. 6). In an example where execution of the registered eBPF function 866 is delayed, the corresponding trigger event should be recognizable by the target platform. The event 842 can be registered as an extended attribute of a file 840 and/or folder in the file system 812, in an embodiment. For example, the name of an extended attribute of the file 840 can represent the event 842. A binary blob 838 of such an extended attribute that is associated with the file 840 should contain the name of the registered eBPF function 866, or contain the registered eBPF function 866 itself. In an example, the extended attribute of the file 840 may be created by means of setxattr tool 834 or setxattr system call. In an embodiment, the registered event 842 may be stored in a dedicated xattr namespace in the file system 812.

Figure 9:
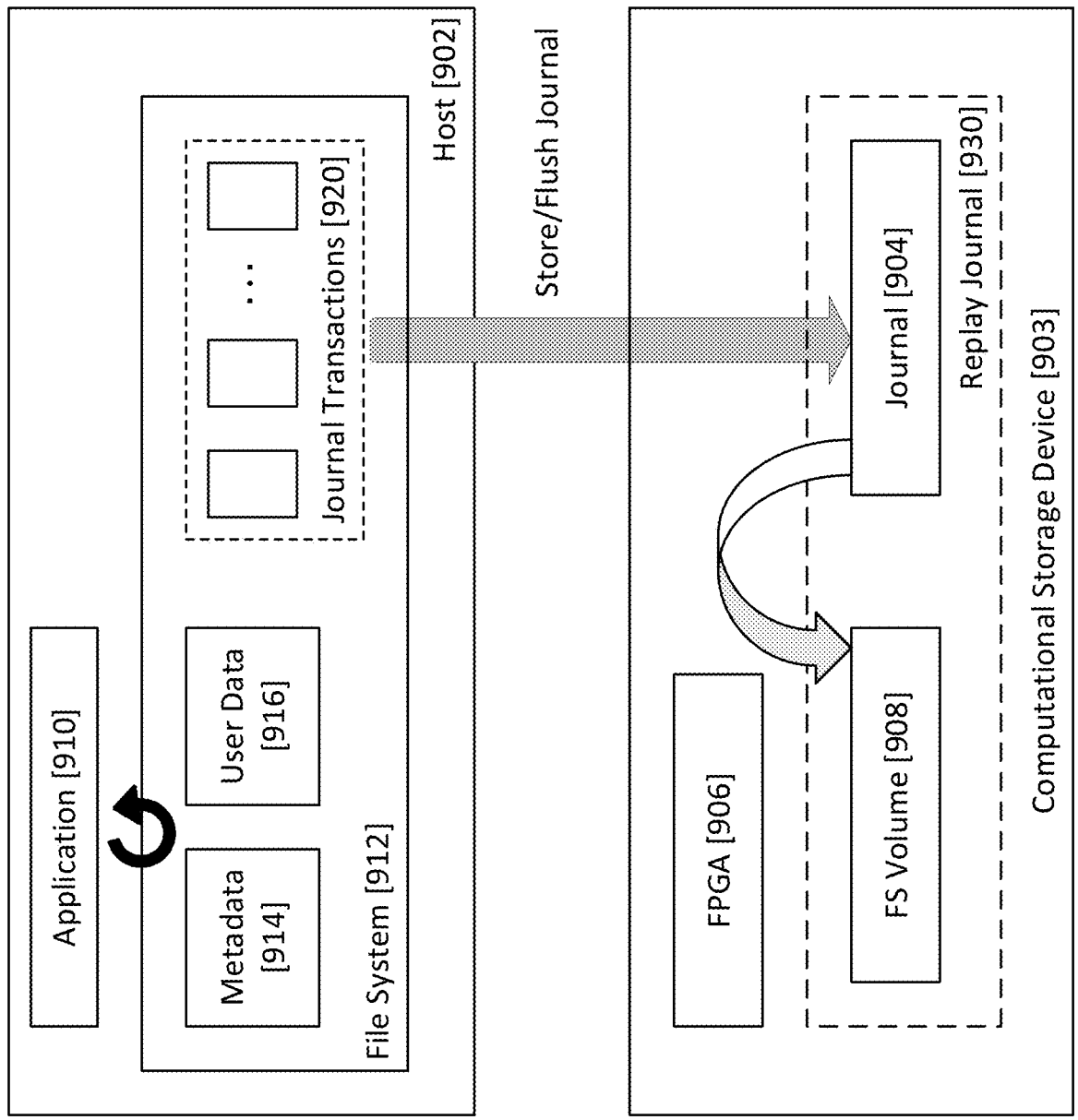
FIG. 9 illustrates a schematic diagram of journaling according to some aspects described herein.

FIG. 9 illustrates a schematic diagram 900 of journaling according to some aspects described herein. The schematic diagram 900 displays a host device 902 with a file system 912 (e.g., a file system driver in a Linux kernel of a host device) and application 910, and a computational storage device 903. The computational storage device 903 can include a journal 904, a field programmable gate array (FPGA) 906, and a file system volume or volume 908. Together, the journal 904 and file system volume 908 may constitute a replay journal 930. The file system 912, which includes metadata 914 and user data 916, can prepare journal transactions 920 that are added into the queue of a journaling subsystem, such as a journaling subsystem for the journal 904. A journaling thread can write the prepared transactions 920 of the journaling subsystem into special partitions or portions of the volume 908. The prepared transactions 920 may be replayed from the volume 908 after specific events (e.g., failed transactions, system start-up, etc.), or after specific periods of time. The journal subsystem for the journal 904 can read transactions from the journal 904 and write transaction contents into requested physical sectors of memory, such as of the volume 908.

Generally, journaling is a file system technique that may be familiar to those of ordinary skill in the art. The goal of journaling techniques in data computation contexts may be to queue eBPF functions that can be executed by computational storage devices, such as any of the computational storage devices disclosed herein. In some examples, journals (such as journal 904) can be implemented as circular buffers that are used to keep a record of data transactions (e.g., data modifications to be performed by a core). Every data transaction may contain a record of a modification of one or more LBAs (e.g., LBAs on a file system volume, such as file system volume 520 or 908).

Data transactions such as creating metadata 914, user data 916, or other types of data may be stored in the journal 904. The file system driver 912 may flush or store the prepared journal transactions 920 into the file system volume 908. If a transaction fails (e.g., the transaction is broken or unable to be completed), then the transaction may be discarded from the journal 904. For example, the journal 904 may be replayed within the computational storage device 903, without replaying the discarded transaction. Replaying the journal 904 (e.g., via commands executed by the FPGA 906) can include creating the actual state of the file system volume 908, based on events that occur within the computational storage device 903.

Generally, journaling techniques are a flash-friendly approach to executing data operations. For example, when a journal (e.g., journal 904) is a circular buffer, there is no update of information in the journal. As a result, journaling techniques incorporated with aspects disclosed herein prolong a lifetime of persistent memory. The journal replay operation discussed above may be implemented by the FPGA 906. Specifically, the journal replay operations may be executed by one or more cores of the FPGA 906 (such as the one or more cores 512 discussed earlier herein with respect to FPGA 506). In conventional systems, journal replay operations may be executed by a host device; however, according to aspects of the present disclosure, journal replay operations can be easily offloaded into the computational storage device 404, thereby freeing up computational resources (e.g., CPU, GPU, etc.) on the host device.

The file system driver 912 may prepare transactions in the journal 904 within memory of the file system driver 902 (e.g., DRAM). For example, the file system driver 912 can prepare one or more 4K pages that each contain one or more journal transactions. After the journal 904 is prepared by the file system driver 912, the journal 904 may be transmitted to the computational storage device 903. Data manipulations and computations based on the journal 904 may then be executed on the computational storage device 903. For example, journal content (e.g., transactions) may be read by the FPGA 906 to perform data manipulation or computations. For example, the FPGA 906 may perform one or more read commands to execute functions or computations based on transactions in a section of the volume 908 that correspond to the journal 904. Generally, methods and systems disclosed herein provide powerful techniques to offload data processing onto a computational storage device (e.g., computational storage device 903) that interacts with a host device (e.g., file system driver 912).

Figure 10:
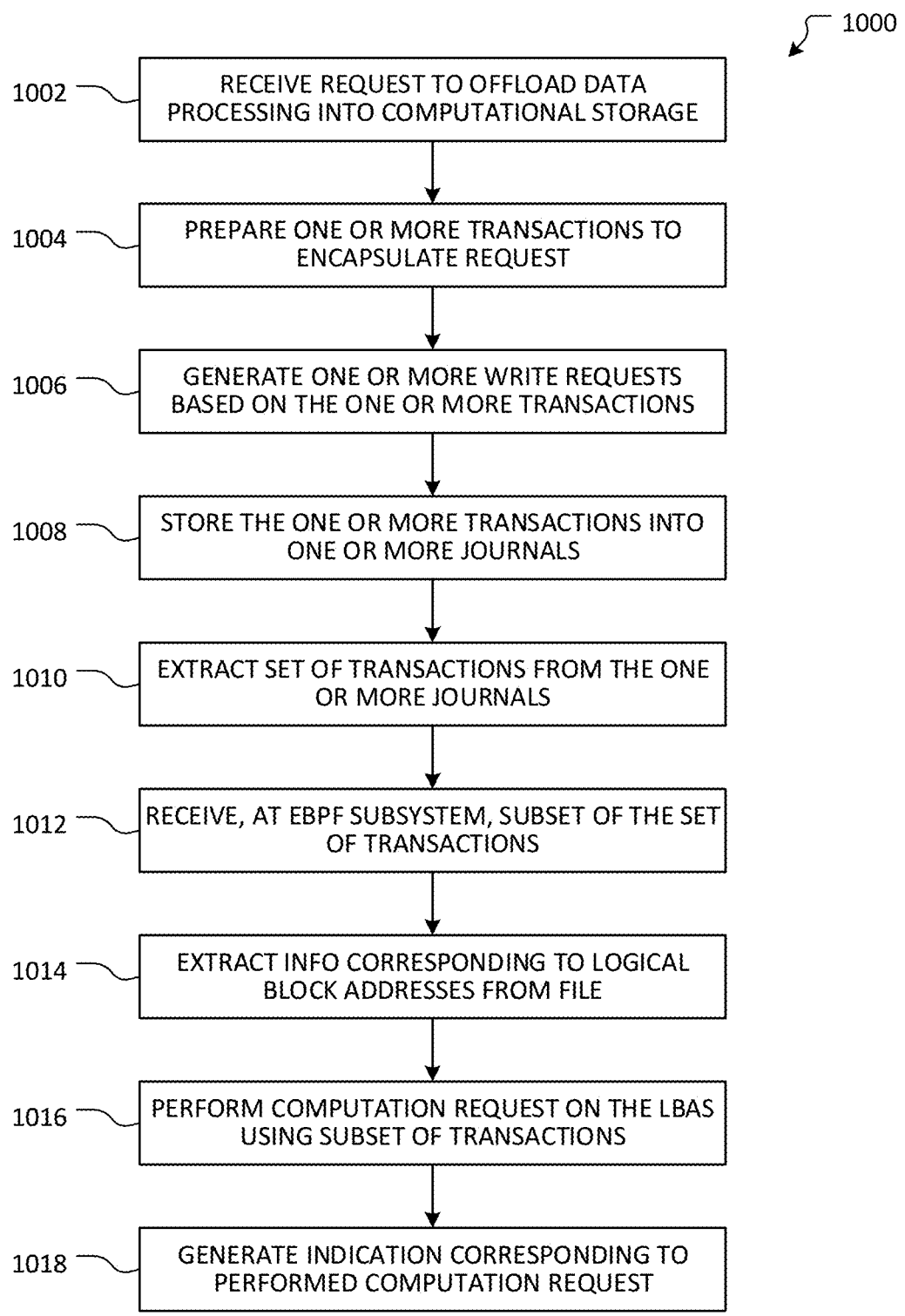
FIG. 10 illustrates a process for offloading data processing into computational storage according to some aspects described herein.
Figure 11:
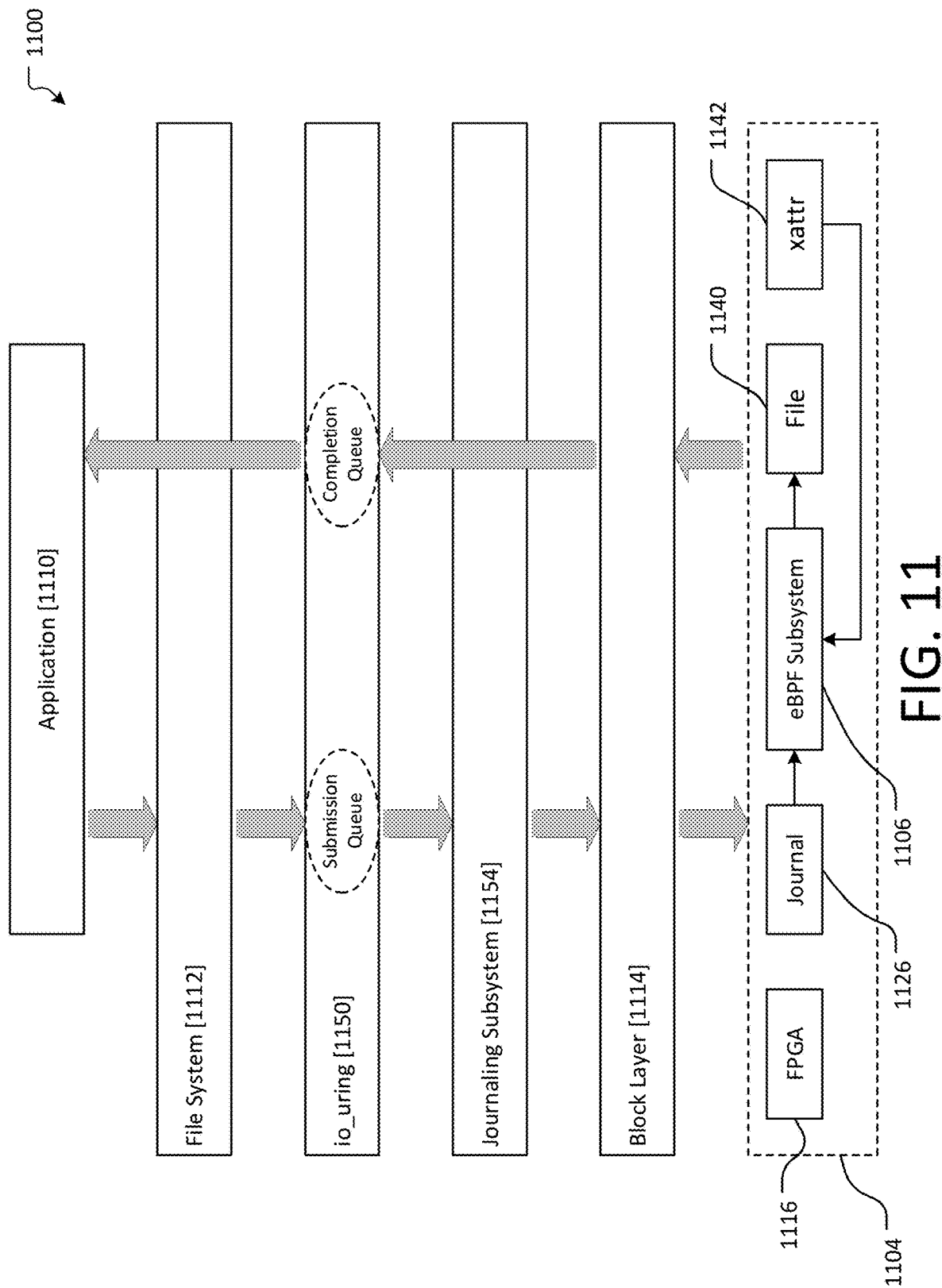
FIG. 11 illustrates a schematic diagram of offloading data processing into computational storage according to some aspects described herein.

FIG. 10 illustrates an example process 1000 for offloading data processing into computational storage according to some aspects described herein. In examples, aspects of method 1000 may be performed by a system, such as system 200, 230, 260, 300, 400, 500, 600, 700, or 800 discussed earlier herein with respect to FIGS. 2-8. FIG. 11 illustrates an example system 1100 with data flows that correspond to aspects of the example method 1000 shown in FIG. 10. The example system 1100 may be similar to the example systems 200, 230, 260, 300, 400, 500, 600, 700, or 800 discussed above with respect to FIGS. 2-8 and may include, for example, an application 1110, file system 1112, io_uring 1150, journaling subsystem 1154, block layer 1114, and computational storage device 1104. In an example, storage device 1104 may include FPGA 1116, journal 1126, eBPF subsystem 1106, file 1140, xattr namespace 1142.

Process 1000 begins at operation 1002, where a request to offload data processing into computation storage is received. In an embodiment, the request may be transmitted by an application (e.g., any of application 310, 610, 710, 810, and 1100 in FIGS. 3, 6, 7, 8, and 11, respectively). For example, the application may transmit the request by defining a file identification (ID), an eBPF function name, or both. The request to offload data processing into computational storage may be prepared by an application programming interface (API). For example, the request to offload data may be implemented by placing the request into a submission queue of io_uring subsystem 1150. In an embodiment, the request to offload data may be implemented by a dedicated system call (e.g., offload_computation(int fd, const char *function_name, . . . )) that is managed by a kernel-space file system (e.g., file system 1112).

The computational storage may correspond to one or more aspects of a storage device (e.g., the computational storage device of systems 200, 230, 260, 300, 400, 500, 600, or 1100). The computational storage can include one of a field programmable gate array (FPGA), an infrastructure processing unit (IPU), a central processing unit (CPU), and a smart network interface controller (smartNIC). The computational storage can further include non-volatile memory or persistent memory (e.g., flash memory) with instructions stored therein. The computational storage can further include a plurality of cores.

At operation 1004, one or more transactions are prepared to encapsulate the request received at operation 1002. In an embodiment, a journaling subsystem (e.g., journaling subsystem for the journal 904 shown in FIG. 9, journaling subsystem 1150 in the system 1100 of FIG. 11) may prepare the one or more transactions to encapsulate the request.

At operation 1006, one or more write requests may be generated based on the one or more transactions prepared at operation 1004. In an embodiment, a journaling subsystem (e.g., journaling subsystem for the journal 904 shown in FIG. 9 and discussed in detail above) may generate the one or more write requests with the transactions prepared at operation 1004.

At operation 1008, the one or more transactions may be stored into one or more journals. For example, the one or more transactions may be stored into one or more journals (e.g., journal 904 shown in FIG. 9, journal 1126 in FIG. 11) by the computational storage device (e.g., the computational storage device of systems 200, 230, 260, 300, 400, 500, 600, 900, or 1100). In an embodiment, the one or more journals may be represented by a dedicated partition of persistent memory (e.g., NAND flash). Additionally, or alternatively, the one or more journals may be represented by a corresponding partition of non-volatile memory (NVM), storage class memory (SCM), byte-addressable memory, or DRAM memory.

At operation 1010, a set of transactions may be extracted from the one or more journals into which the prepared transactions were stored at operation 1008. In an example, FPGA logic 1116 of the computational storage device (e.g., the computational storage device of systems 200, 230, 260, 300, 400, 500, 600, 900, or 1100) may retrieve the set of transactions from the one or more journals (e.g., journal 904 or 1126 shown in FIGS. 9 and 11, respectively).

At operation 1012, a subset of the set of transactions extracted at operation 1010 may be received at an eBPF subsystem (e.g., eBPF subsystem 1106 of computational storage 1104 in FIG. 11). In an example, the subset of the set of transactions received at operation 1012 corresponds to one or more computation requests.

At operation 1014, information corresponding to one or more logical block addresses (LBAs) may be extracted from a file. In an embodiment, the eBPF subsystem 1106 may extract information about placement of the eBPF function and load the function logic to prepare the execution. The eBPF function can be represented by a special functional block implemented by the FPGA logic 1116. Additionally, or alternatively, the eBPF function can be represented by an extended attribute stored into an LBA that needs to be loaded and represented by the FPGA logic 1116. In an embodiment, the eBPF function can be represented by an item of eBPF maps.

At operation 1016, the one or more computation requests may be performed on the one or more LBAs using the subset of the set of transactions.

At operation 1018, an indication corresponding to the performed computation requests may be generated. In an example, the computational storage may return a status code of the executed operation to the block layer 1114. The block layer 1114 may place a completion queue entry (CQE) in the completion queue of io_uring 1150, in an embodiment. The application 1110 may then check the status of the offloaded data processing execution.

Figure 12:
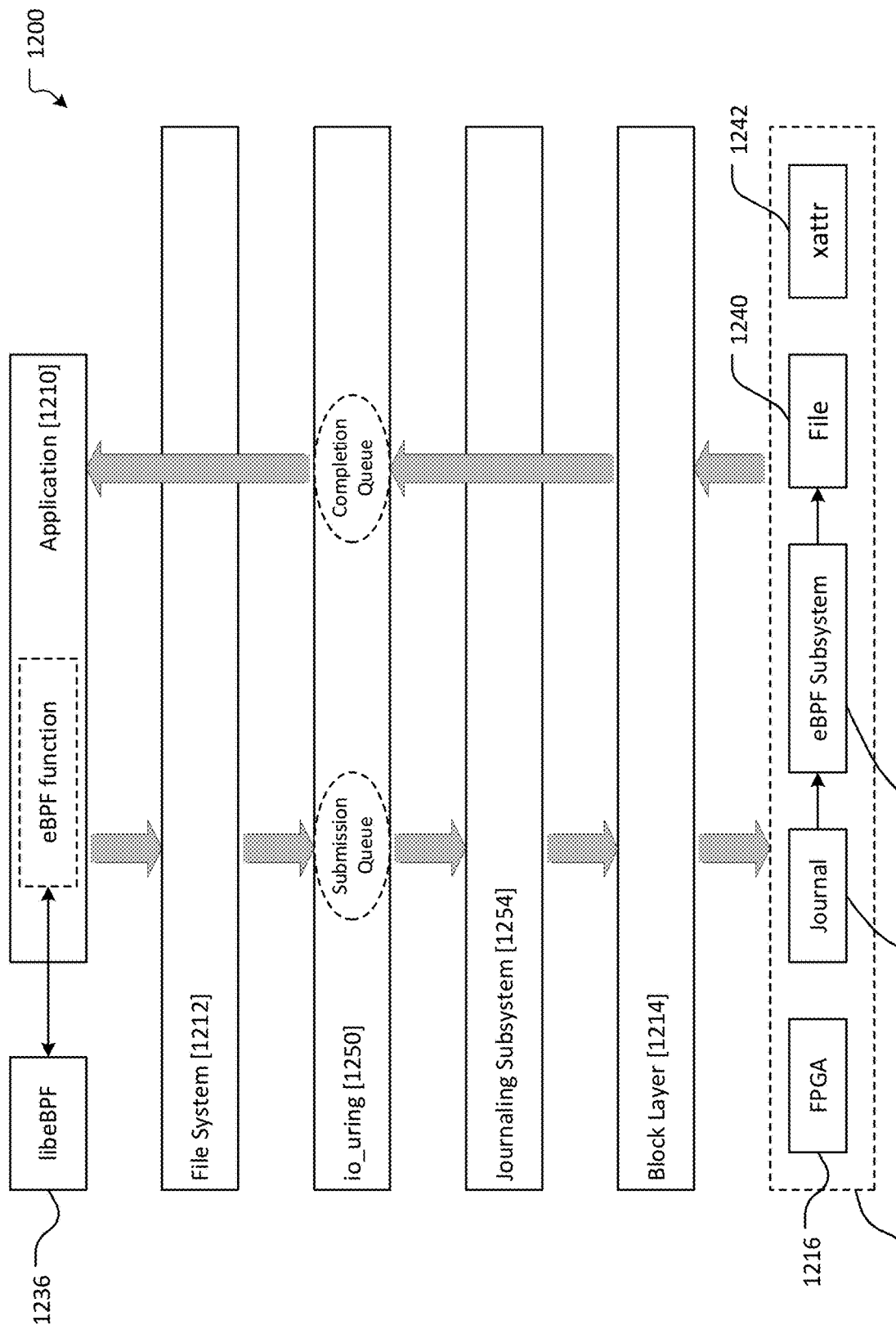
FIG. 12 illustrates a schematic diagram of offloading data processing into computational storage according to some aspects described herein.

FIG. 11, which is described in detail above with respect to the operations of the method 1000 of FIG. 10, shows an example of offloading data processing into computation storage when the eBPF function is already stored as an extended attribute of the file/folder. In such an example, the journal transaction needs to identify the location (LBA) of the eBPF function for execution of logic of data transformation. FIG. 12 illustrates an example system 1200 for offloading data processing into computational storage in which an application 1210 prepares an eBPF function and sends the eBPF function to computational storage 1204 as part of a journal transaction. In the example of FIG. 12, use of an extended attribute of a file/folder is not necessary. FIG. 12 shows many of the same data flows as in the example system 1100 of FIG. 11, and which correspond to aspects of the example method 1000 shown in FIG. 10. The example system 1200 may be similar to the example systems 200, 230, 260, 300, 400, 500, 600, 700, 800, or 1100 discussed above with respect to FIGS. 2-8 and 11 and may include, for example, application 1210, libeBPF 1236, file system 1212, io_uring 1250, journaling subsystem 1254, block layer 1214, and computational storage device 1204. In an example, storage device 1204 may include FPGA 1216, journal 1226, eBPF subsystem 1206, file 1240, xattr namespace 1242.

Figure 13:
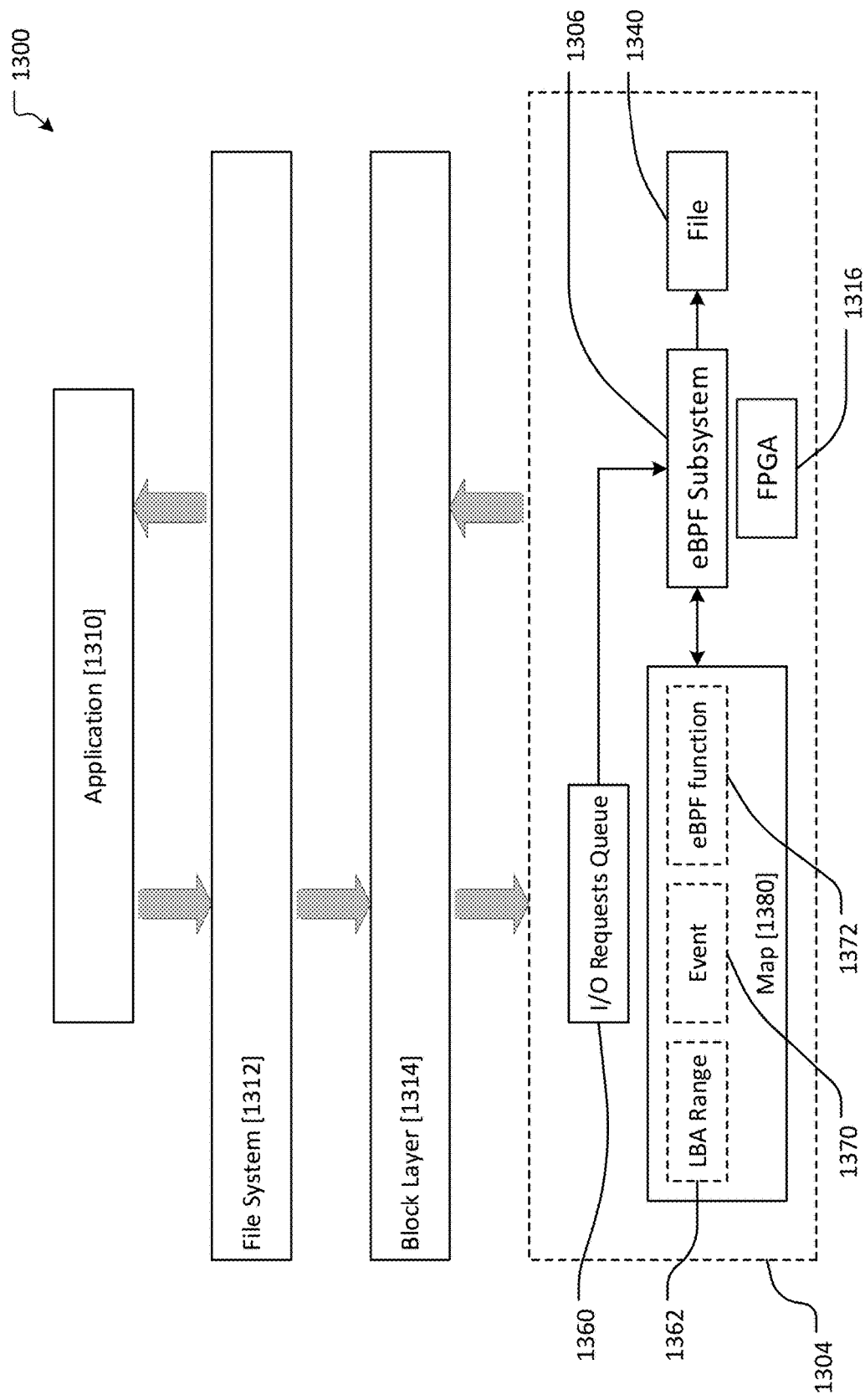
FIG. 13 illustrates a schematic diagram of offloading data processing into computational storage according to some aspects described herein.

FIG. 13 shows an example system 1300 for offloading data processing into computational storage 1304 in which an eBPF function 1372 is registered and stored as an item of a map subsystem 1380. In the system 1300 of FIG. 13, a journal transaction can simply identify the name of the eBPF function 1372, and the identified name may be used to execute the eBPF function 1372 by accessing the eBPF function 1372 in the map subsystem 1380. FIG. 13 shows some of the same data flows as in the example systems 1100 and 1200 of FIGS. 11 and 12, respectively, and which correspond to certain aspects of the example method 1000 shown in FIG. 10. The example system 1300 may be similar to the example systems 200, 230, 260, 300, 400, 500, 600, 700, 800, 1100, or 1200 discussed above with respect to FIGS. 2-8, 11, and 12 and may include, for example, application 1310, file system 1312, block layer 1314, and computational storage device 1304. In an example, storage device 1304 may include FPGA 1316, eBPF subsystem 1306, file 1340, I/O requests queue 1360, and map subsystem 1380. The map subsystem 1380 may, for example, be comprised of LBA Range 1362, event 1370, and the eBPF function 1372.

Figure 14:
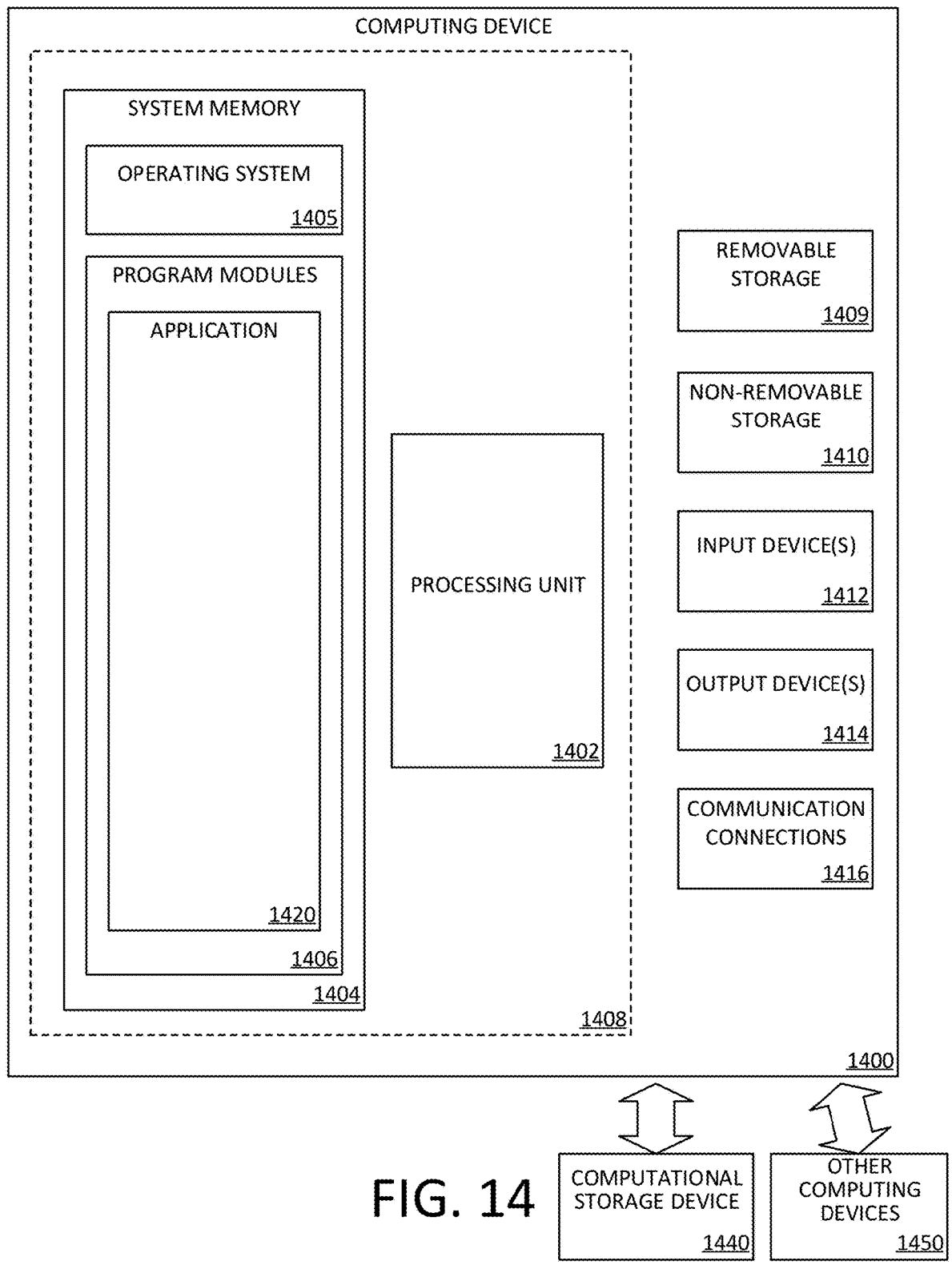
FIG. 14 is a block diagram illustrating physical components of a computing device with which aspects of the disclosure may be practiced.
Figure 15A:
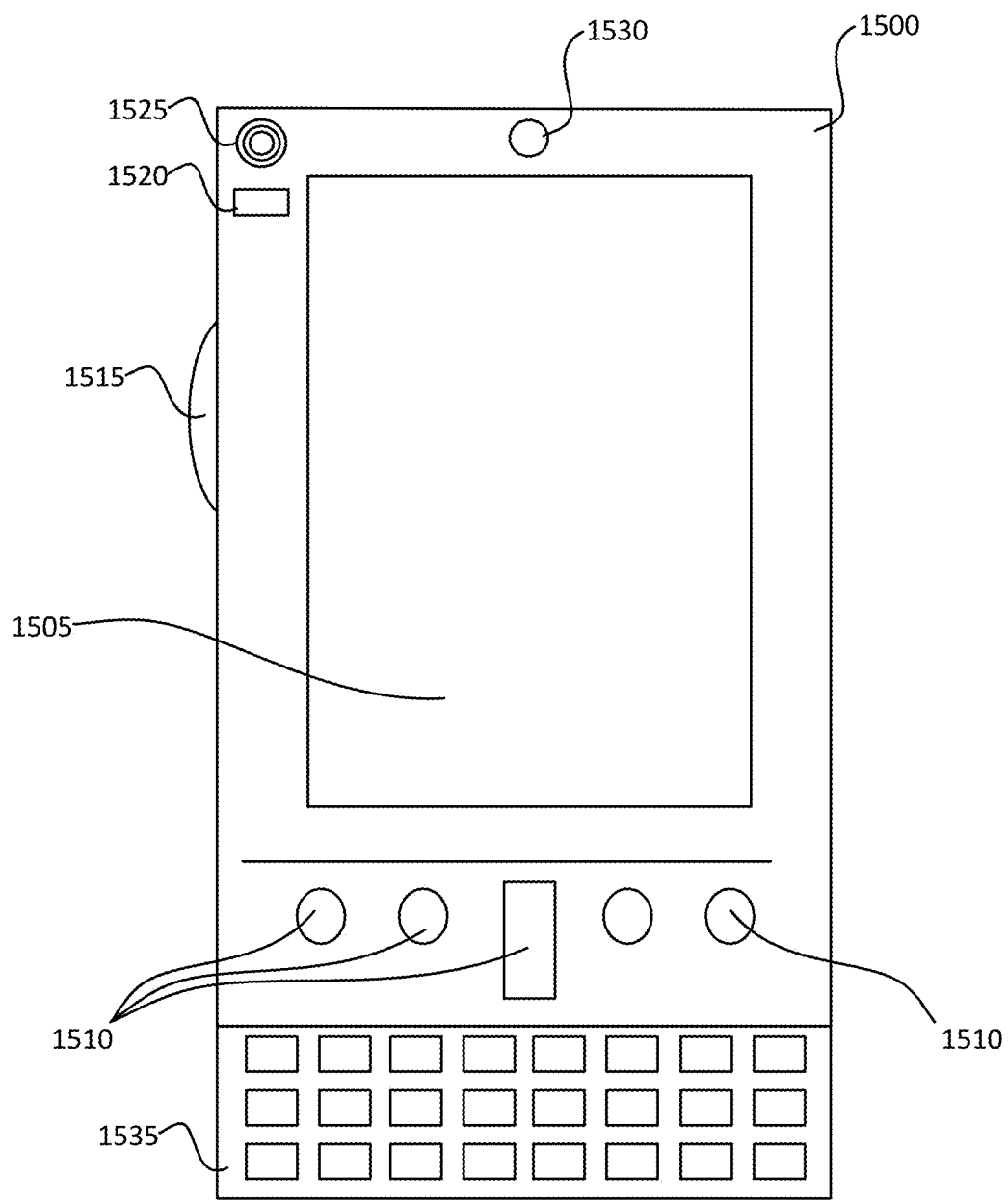
FIG. 15A illustrates a mobile computing device with which embodiments of the disclosure may be practiced.
Figure 15B:
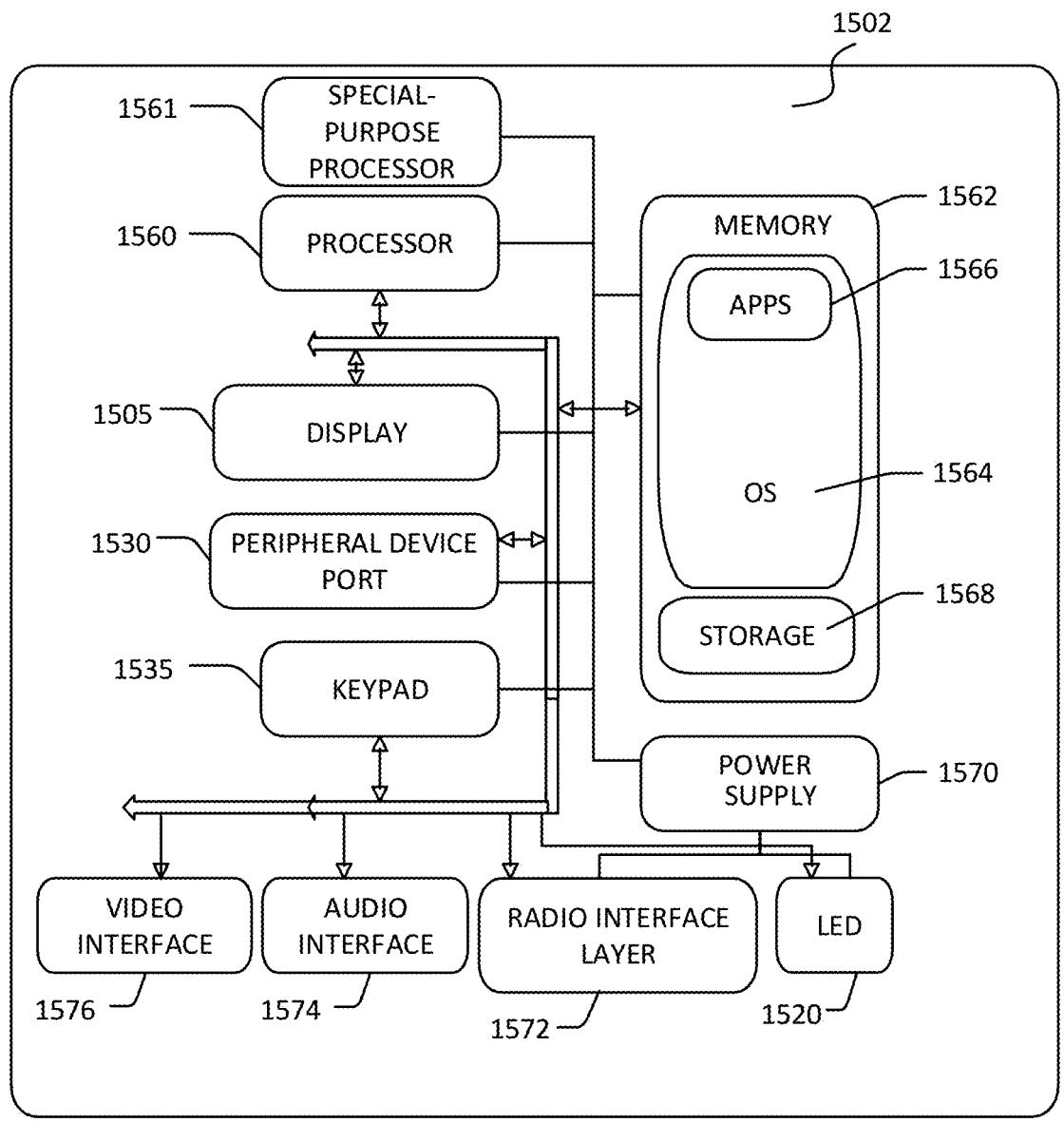
FIG. 15B is a block diagram illustrate the architecture of one aspect of a mobile computing device.
Figure 16:
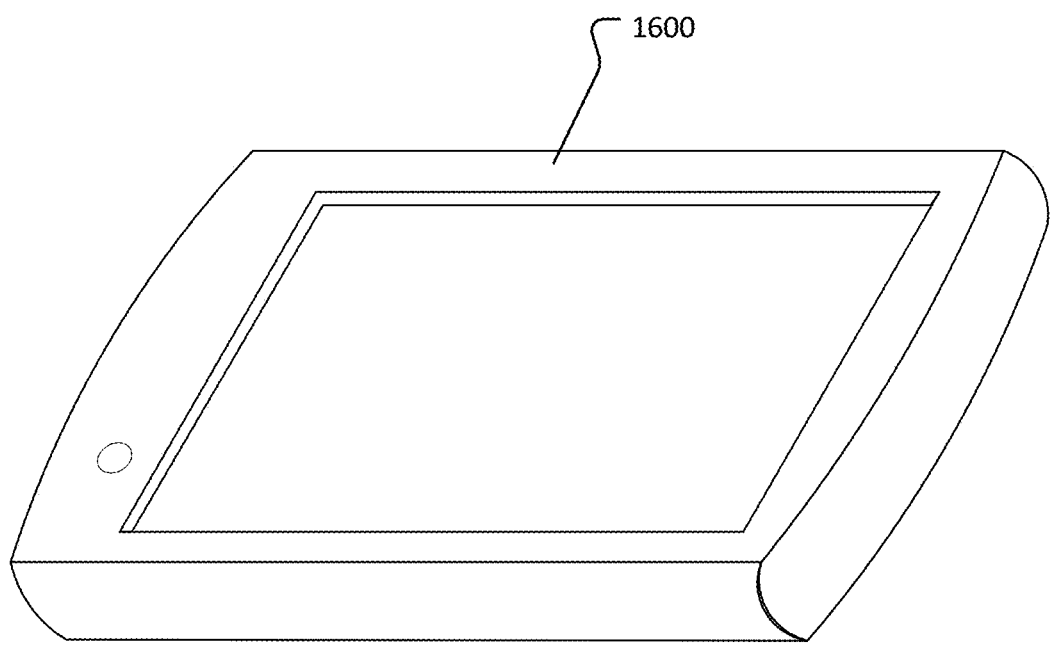
FIG. 16 illustrates an exemplary tablet computing device that may execute one or more aspects disclosed herein.

FIGS. 14-16 and the associated descriptions provide a discussion of a variety of operating environments in which aspects of the disclosure may be practiced. However, the devices and systems illustrated and discussed with respect to FIGS. 14-16 are for purposes of example and illustration and are not limiting of a vast number of computing device configurations that may be utilized for practicing aspects of the disclosure, described herein.

FIG. 14 is a block diagram illustrating physical components (e.g., hardware) of a computing device 1400 with which aspects of the disclosure may be practiced. The computing device components described below may be suitable for the computing devices described above, including host devices and file systems 102, 202, 232, 262, 302, 402, 602, 712, 812, 1112, 1212, and 1312 discussed with respect to FIGS. 1-13. In a basic configuration, the computing device 1400 may include at least one processing unit 1402 and a system memory 1404. Depending on the configuration and type of computing device, the system memory 1404 may comprise, but is not limited to, volatile storage (e.g., random access memory), non-volatile storage (e.g., read-only memory), flash memory, or any combination of such memories.

The system memory 1404 may include an operating system 1405 and one or more program modules 1406 suitable for running software application 1420, such as one or more components supported by the systems described herein. The operating system 1405, for example, may be suitable for controlling the operation of the computing device 1400.

Furthermore, embodiments of the disclosure may be practiced in conjunction with a graphics library, other operating systems, or any other application program and is not limited to any particular application or system. This basic configuration is illustrated in FIG. 14 by those components within a dashed line 1408. The computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage device 1409 and a non-removable storage device 1410.

As stated above, a number of program modules and data files may be stored in the system memory 1404. While executing on the processing unit 1402, the program modules 1406 (e.g., application 1420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1400 may also have one or more input device(s) 1412 such as a keyboard, a mouse, a pen, a sound or voice input device, a touch or swipe input device, etc. The output device(s) 1414 such as a display, speakers, a printer, etc. may also be included. The aforementioned devices are examples and others may be used. The computing device 1700 may include one or more communication connections 1416 allowing communications with other computing devices 1450 or computational storage devices 1440. Examples of suitable communication connections 1416 include, but are not limited to, radio frequency (RF) transmitter, receiver, and/or transceiver circuitry; universal serial bus (USB), parallel, and/or serial ports. The computational storage devices 1440 may be similar to the computational storage devices 104, 204, 234, 264, 304, 404, 504, 604, 1004, 1104, and 1204 discussed with respect to FIGS. 1-12.

The term computer readable media as used herein may include computer storage media. Computer storage media may include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. Any such computer storage media may be part of the computing device 1400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 15A and 15B illustrate a mobile computing device 1500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 15A, one aspect of a mobile computing device 1500 for implementing the aspects is illustrated. In a basic configuration, the mobile computing device 1500 is a handheld computer having both input elements and output elements. The mobile computing device 1500 typically includes a display 1505 and one or more input buttons 1510 that allow the user to enter information into the mobile computing device 1500. The display 1505 of the mobile computing device 1500 may also function as an input device (e.g., a touch screen display).

If included, an optional side input element 1515 allows further user input. The side input element 1515 may be a rotary switch, a button, or any other type of manual input element. In alternative aspects, mobile computing device 1500 may incorporate more or less input elements. For example, the display 1505 may not be a touch screen in some embodiments.

In yet another alternative embodiment, the mobile computing device 1500 is a portable phone system, such as a cellular phone. The mobile computing device 1500 may also include an optional keypad 1535. Optional keypad 1535 may be a physical keypad or a "soft" keypad generated on the touch screen display.

In various embodiments, the output elements include the display 1505 for showing a graphical user interface (GUI), a visual indicator 1520 (e.g., a light emitting diode), and/or an audio transducer 1525 (e.g., a speaker). In some aspects, the mobile computing device 1500 incorporates a vibration transducer for providing the user with tactile feedback. In yet another aspect, the mobile computing device 1500 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one aspect of a mobile computing device. That is, the mobile computing device 1500 can incorporate a system (e.g., an architecture) 1502 to implement some aspects. In one embodiment, the system 1502 is implemented as a "smart phone" capable of running one or more applications (e.g., browser, e-mail, calendaring, contact managers, messaging clients, games, and media clients/players). In some aspects, the system 1502 is integrated as a computing device, such as an integrated personal digital assistant (PDA) and wireless phone.

One or more application programs 1566 may be loaded into the memory 1562 and run on or in association with the operating system 1564. Examples of the application programs include phone dialer programs, e-mail programs, personal information management (PIM) programs, word processing programs, spreadsheet programs, Internet browser programs, messaging programs, and so forth. The system 1502 also includes a non-volatile storage area 1568 within the memory 1562. The non-volatile storage area 1568 may be used to store persistent information that should not be lost if the system 1502 is powered down. The application programs 1566 may use and store information in the non-volatile storage area 1568, such as e-mail or other messages used by an e-mail application, and the like. A synchronization application (not shown) also resides on the system 1502 and is programmed to interact with a corresponding synchronization application resident on a host computer to keep the information stored in the non-volatile storage area 1568 synchronized with corresponding information stored at the host computer. As should be appreciated, other applications may be loaded into the memory 1562 and run on the mobile computing device 1500 described herein (e.g., a signal identification component, a gaze tracker component, a shared computing component, etc.).

The system 1502 has a power supply 1570, which may be implemented as one or more batteries. The power supply 1570 might further include an external power source, such as an AC adapter or a powered docking cradle that supplements or recharges the batteries.

The system 1502 may also include a radio interface layer 1572 that performs the function of transmitting and receiving radio frequency communications. The radio interface layer 1572 facilitates wireless connectivity between the system 1502 and the "outside world," via a communications carrier or service provider. Transmissions to and from the radio interface layer 1572 are conducted under control of the operating system 1564. In other words, communications received by the radio interface layer 1572 may be disseminated to the application programs 1566 via the operating system 1564, and vice versa.

The visual indicator 1520 may be used to provide visual notifications, and/or an audio interface 1574 may be used for producing audible notifications via the audio transducer 1525. In the illustrated embodiment, the visual indicator 1520 is a light emitting diode (LED) and the audio transducer 1525 is a speaker. These devices may be directly coupled to the power supply 1570 so that when activated, they remain on for a duration dictated by the notification mechanism even though the processor 1560 and/or special-purpose processor 1561 and other components might shut down for conserving battery power. The LED may be programmed to remain on indefinitely until the user takes action to indicate the powered-on status of the device. The audio interface 1574 is used to provide audible signals to and receive audible signals from the user. For example, in addition to being coupled to the audio transducer 1525, the audio interface 1574 may also be coupled to a microphone to receive audible input, such as to facilitate a telephone conversation. In accordance with embodiments of the present disclosure, the microphone may also serve as an audio sensor to facilitate control of notifications, as will be described below. The system 1502 may further include a video interface 1576 that enables an operation of an on-board camera 1530 to record still images, video stream, and the like.

A mobile computing device 1500 implementing the system 1502 may have additional features or functionality. For example, the mobile computing device 1500 may also include additional data storage devices (removable and/or non-removable) such as, magnetic disks, optical disks, or tape. Such additional storage is illustrated in FIG. 15B by the non-volatile storage area 1568.

Data/information generated or captured by the mobile computing device 1500 and stored via the system 1502 may be stored locally on the mobile computing device 1500, as described above, or the data may be stored on any number of storage media that may be accessed by the device via the radio interface layer 1572 or via a wired connection between the mobile computing device 1500 and a separate computing device associated with the mobile computing device 1500, for example, a server computer in a distributed computing network, such as the Internet. As should be appreciated such data/information may be accessed via the mobile computing device 1500 via the radio interface layer 1572 or via a distributed computing network. Similarly, such data/information may be readily transferred between computing devices for storage and use according to well-known data/information transfer and storage means, including electronic mail and collaborative data/information sharing systems.

FIG. 16 illustrates an exemplary tablet computing device 1600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In accordance with at least one example of the present disclosure, a method is described. The method may include receiving a request to offload data processing into computational storage; preparing one or more transactions to encapsulate the request; generating one or more write requests, based on the one or more transactions; storing the one or more transactions into one or more journals; extracting a set of transactions from the one or more journals; receiving, at an eBPF subsystem, a subset of the set of transactions, the subset corresponding to one or more computation requests; extracting information from a file, the information corresponding to one or more logical block addresses (LBAs); performing the one or more computation requests on the one or more LBAs using the subset of the set of transactions; and generating an indication corresponding to the performed computation requests.

In accordance with at least one aspect of the above example, an application may transmit the request by defining one or more of (i) a file identification (ID) and (ii) an eBPF function name.

In accordance with at least one aspect of the above example, the application may receive the indication corresponding to the performed computation request.

In accordance with at least one aspect of the above example, the request to offload data may be implemented by a dedicated system call that is managed by a kernel-space file system.

In accordance with at least one aspect of the above example, the request may be prepared by an application programming interface (API).

In accordance with at least one aspect of the above example, the one or more journals may each be represented by a corresponding partition of one or more from the group comprising (i) persistent memory, (ii) non-volatile memory (NVM), (iii) storage class memory (SCM), (iv) byte-addressable memory, and (v) DRAM memory.

In accordance with at least one aspect of the above example, the method may further include, prior to preparing the one or more transactions to encapsulate the request, storing the request into a submission queue.

In accordance with at least one aspect of the above example, the one or more LBAs may comprise a range of LBAs, and the one or more computation requests may be performed on the range of LBAs.

In accordance with at least one aspect of the above example, the computational storage may invluce one or more cores of a field programmable gate array (FPGA).

In accordance with at least one example of the present disclosure, a system is described. In example, the system may include a first device comprising a computational component; a second device comprising a computational component; and memory storing instructions that, when executed by the computational component of at least one of the first device and the second device, causes the system to perform a set of operations. In examples, the set of operations may include receiving, via the computational component of the first device, a request to offload data processing into the second device; preparing, via the computational component of the first device, one or more transactions to encapsulate the request; generating, via the computational component of the first device, one or more write requests based on the one or more transactions; storing, via the computational component of the first device, the one or more transactions into one or more journals of the first device; extracting, via the computational component of the second device, a set of transactions from the one or more journals; receiving, via an eBPF subsystem of the second device, a subset of the set of transactions, the subset corresponding to one or more computation requests; extracting, via the computational component of the second device, information from a file, the information corresponding to one or more logical block addresses (LBAs); performing, via the computational component of the second device, the one or more computation requests on the one or more LBAs using the subset of the set of transactions; and generating, via the computational component of the second device, an indication corresponding to the performed computation requests.

In accordance with at least one aspect of the above example, the computational component of the first device may be a central processing unit (CPU), and the computational component of the second device may be a field programmable gate array (FPGA) comprising one or more cores.

In accordance with at least one aspect of the above example, the first device may include an application and the set of operations may include transmitting, via the application of the first device, the request by defining one or more of (i) a file identification (ID) and (ii) an eBPF function name.

In accordance with at least one aspect of the above example, the set of operations may include receiving, via the application of the first device, the indication corresponding to the performed computation request.

In accordance with at least one aspect of the above example, the request to offload data may be implemented by a dedicated system call that is managed by a kernel-space file system of the first device.

In accordance with at least one aspect of the above example, the request may be prepared by an application programming interface (API) of the first device.

In accordance with at least one aspect of the above example, the one or more journals may each be represented by a corresponding partition of one or more from the group comprising (i) persistent memory, (ii) non-volatile memory (NVM), (iii) storage class memory (SCM), (iv) byte-addressable memory, and (v) DRAM memory.

In accordance with at least one aspect of the above example, the set of operations may include, prior to preparing the one or more transactions to encapsulate the request, storing, via the computational component of the first device, the request into a submission queue.

In accordance with at least one aspect of the above example, the one or more LBAs may comprise a range of LBAs, and the one or more computation requests may be performed on the range of LBAs.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, the method comprising:
   receiving a request to offload data computation into computational storage;
   preparing one or more transactions to encapsulate the request;
   generating one or more write requests, based on the one or more transactions;
   storing the one or more transactions into one or more journals;
   extracting a set of transactions from the one or more journals;
   receiving, at an extended Berkeley packet filter (eBPF), subsystem, a subset of the set of transactions, the subset corresponding to one or more computation requests, the set of transactions is extracted from the one or more journals in response to determining that an event has been initiated in the computational storage, and the event is associated with an eBPF function;
   extracting information from a file, the information corresponding to one or more logical block addresses (LBAs), wherein the event is registered as an extended attribute of the file;
   performing the one or more computation requests on the one or more LBAs using the subset of the set of transactions; and
   generating an indication corresponding to the performed computation requests.

2. The method of claim 1, wherein an application transmits the request by defining one or more of (i) a file identification (ID) and (ii) an eBPF function name.

3. The method of claim 2, wherein the application receives the indication corresponding to the performed computation request.

4. The method of claim 1, wherein the request to offload data computation is implemented by an application or a subsystem.

5. The method of claim 1, wherein the request is prepared by an application programming interface (API).

6. The method of claim 1, wherein the one or more journals are each represented by a corresponding partition of one or more from the group comprising (i) persistent memory, (ii) non-volatile memory (NVM), (iii) storage class memory (SCM), (iv) byte-addressable memory, and (v) DRAM memory.

7. The method of claim 1, further comprising, prior to preparing the one or more transactions to encapsulate the request, storing the request into a submission queue.

8. The method of claim 1, wherein the one or more LBAs comprise a range of LBAs, and wherein the one or more computation requests are performed on the range of LBAs.

9. The method of claim 1, wherein the computational storage includes one or more cores of a field programmable gate array (FPGA), an application-specific integrated circuit (ASIC), or a RISC-V.

10. The method of claim 1, wherein a binary blob of the extended attribute of the file of the registered event includes the name of the eBPF function.

11. A system comprising:
a first device comprising a computational component;
a second device comprising a computational component; and
memory storing instructions that, when executed by the computational component of at least one of the first device and the second device, causes the system to perform a set of operations comprising:
receiving, via the computational component of the first device, a request to offload data computation into the second device;
preparing, via the computational component of the first device, one or more transactions to encapsulate the request;
generating, via the computational component of the first device, one or more write requests based on the one or more transactions;
storing, via the computational component of the first device, the one or more transactions into one or more journals of the first device;
extracting, via the computational component of the second device, a set of transactions from the one or more journals;
receiving, via an extended Berkeley packet filter (eBPF) subsystem of the second device, a subset of the set of transactions, the subset corresponding to one or more computation requests the set of transactions is extracted from the one or more journals in response to determining that an event has been initiated in the computational storage, and the event is associated with an eBPF function;
extracting, via the computational component of the second device, information from a file, the information corresponding to one or more logical block addresses (LBAs), wherein the event is registered as an extended attribute of the file;
performing, via the computational component of the second device, the one or more computation requests on the one or more LBAs using the subset of the set of transactions; and
generating, via the computational component of the second device, an indication corresponding to the performed computation requests.

12. The system of claim 11, wherein the computational component of the first device is a central processing unit (CPU), and wherein the computational component of the second device is
a field programmable gate array (FPGA), an application-specific integrated circuit (ASIC), or a RISC-V comprising one or more cores.

13. The system of claim 11, wherein the first device includes an application and the set of operations includes:
transmitting, via the application of the first device, the request by defining one or more of (i) a file identification (ID) and (ii) an eBPF function name.

14. The system of claim 13, wherein the set of operations includes:
receiving, via the application of the first device, the indication corresponding to the performed computation request.

15. The system of claim 11, wherein the request to offload data is implemented by an application or a subsystem of the first device.

16. The system of claim 11, wherein the request is prepared by an application programming interface (API) of the first device.

17. The system of claim 11, wherein the one or more journals are each represented by a corresponding partition of one or more from the group comprising (i) persistent memory, (ii) non-volatile memory (NVM), (iii) storage class memory (SCM), (iv) byte-addressable memory, and (v) DRAM memory.

18. The system of claim 11, wherein the set of operations includes:
prior to preparing the one or more transactions to encapsulate the request, storing, via the computational component of the first device, the request into a submission queue.

19. The system of claim 11, wherein the one or more LBAs comprise a range of LBAs, and wherein the one or more computation requests are performed on the range of LBAs.

20. The system of claim 11, wherein a binary blob of the extended attribute of the file of the registered event includes the name of the eBPF function.

* * * * *